US011980202B2

(12) United States Patent
Nussinovitch et al.

(10) Patent No.: US 11,980,202 B2
(45) Date of Patent: May 14, 2024

(54) PROTECTIVE COATING FOR PLANTS AND POSTHARVEST PLANT MATTER

(71) Applicant: Yissum Research Development Company of the Hebrew University of Jerusalem Ltd, Jerusalem (IL)

(72) Inventors: Amos Nussinovitch, Rehovot (IL); Gal Sason, Rehovot (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 60 days.

(21) Appl. No.: 17/597,635

(22) PCT Filed: Jul. 15, 2020

(86) PCT No.: PCT/IL2020/050790
§ 371 (c)(1),
(2) Date: Jan. 14, 2022

(87) PCT Pub. No.: WO2021/009755
PCT Pub. Date: Jan. 21, 2021

(65) Prior Publication Data
US 2022/0369658 A1 Nov. 24, 2022

Related U.S. Application Data

(60) Provisional application No. 62/874,512, filed on Jul. 16, 2019.

(51) Int. Cl.
*A23B 7/16* (2006.01)
*A23B 7/154* (2006.01)
*A23B 7/157* (2006.01)

(52) U.S. Cl.
CPC ............... *A23B 7/16* (2013.01); *A23B 7/154* (2013.01); *A23B 7/157* (2013.01)

(58) Field of Classification Search
CPC ............ A23B 7/16; A23B 7/154; A23B 7/157
(Continued)

(56) References Cited

U.S. PATENT DOCUMENTS

| 4,504,504 A | 3/1985 | Gaehring et al. |
| 4,837,037 A | 6/1989 | Kirsop et al. |

(Continued)

FOREIGN PATENT DOCUMENTS

| CN | 1266353 A | 9/2000 |
| CN | 104320974 A | 1/2015 |

(Continued)

OTHER PUBLICATIONS

Translation of JP-H04288001-A (Year: 1992).*
(Continued)

*Primary Examiner* — Brent T O'Hern
(74) *Attorney, Agent, or Firm* — Allan A. Fanucci

(57) ABSTRACT

The present invention relates to a method for forming a protective coating on a plant tissue following the consecutives steps of: (a) providing a plant having an external surface, wherein a portion of the external surface includes an exposed surface; (b) applying a first aqueous solution that contains a crosslinking agent to the external surface of the plant; and (c) applying to the external surface of the plant a second aqueous solution that contains a polysaccharide which is susceptible to crosslinking by the crosslinking agent, thereby forming a protective coating on the exposed surface of the plant. Further provided is a postharvest plant matter that includes a first segment covered by natural skin, and a second segment having an exposed surface that is coated by a protective coating that contains a polysaccharide with the first segment being essentially free of the protective coating.

9 Claims, 4 Drawing Sheets

(58) Field of Classification Search
USPC .......................................................... 426/102
See application file for complete search history.

(56) References Cited

U.S. PATENT DOCUMENTS

| | | | |
|---|---|---|---|
| 5,993,891 | A | 11/1999 | Danielson et al. |
| 6,068,867 | A | 5/2000 | Nussinovitch et al. |
| 6,159,512 | A | 12/2000 | Reyes |
| 6,299,915 | B1 | 10/2001 | Nussinovitch et al. |
| 2017/0303575 | A1* | 10/2017 | Girard .................... A23P 20/17 |

FOREIGN PATENT DOCUMENTS

| | | | |
|---|---|---|---|
| CN | 105246341 A | | 1/2016 |
| CN | 105705555 A | | 6/2016 |
| CN | 105899081 A | | 8/2016 |
| CN | 107105684 A | | 8/2017 |
| EP | 2279675 A1 | | 2/2011 |
| JP | H04288001 A | * | 10/1992 |
| JP | H04288001 A | | 10/1992 |
| WO | 97/023138 A1 | | 7/1997 |
| WO | 99/07230 A1 | | 2/1999 |
| WO | 01/03511 A1 | | 1/2001 |
| WO | 2010/010059 A1 | | 1/2010 |
| WO | 2011/123949 A1 | | 10/2011 |
| WO | 2015/097335 A1 | | 7/2015 |
| WO | 2015/142303 A1 | | 9/2015 |
| WO | 2015/183833 A1 | | 12/2015 |
| WO | 2016/084094 A1 | | 6/2016 |

OTHER PUBLICATIONS

Ayhan et al. (2009) "Overall Quality and Shelf Life of Minimally Processed and Modified Atmosphere Packaged Ready-to-Eat' Pomegranate Arils," J Food Sci 74(5): C399-C405.
Costa et al. (2013) "Antimicrobial Treatments to Preserve Packaged Ready-to-Eat Table Grapes," Food Technol Biotechnol 51(2) 301-307.
Dutta et al. (2009) "Perspectives for chitosan based antimicrobial films in food applications," Food Chemistry 114(4): 1173-1182.
Olivas et al. (2005) "Edible Coatings for Fresh-Cut Fruits," Crit Rev Food Sci Nutr 45(7-8): 657-670.
Özdemir et al. (2017) "Extending the shelf-life of pomegranate arils with chitosan-ascorbic acid coating," LWT—Food Science and Technology 76: 172-180.
Park (1999) "Development of advanced edible coatings for fruits," Trends in Food Science & Technology 10(8): 254-260.
Quintavalla et al. (2002) "Antimicrobial food packaging in meat industry," Meat Sci 62(3): 373-380.
Sepúlveda et al. (2000) "Minimal processing of pomegranate var. Wonderful.,"In: Melgarejo, Martínez-Nicolás, Martínez-Tomé J (eds). Production, processing and marketing of pomegranate in the Mediterranean region: Advances in research and technology. Zaragoza: CIHEAM, 2000. pp. 237-242 (Options Méditerranéennes: Série A. Séminaires Méditerranéens; n. 42).
International Search Report, International Application No. PCT/IL2020/050790, dated Oct. 15, 2020.
Written Opinion of the International Searching Authority, International Application No. PCT/IL2020/050790, dated Oct. 15, 2020.
International Preliminary Report on Patentability (Chapter I), International Application No. PCT/IL2020,050790, dated Jan. 18, 2022.

* cited by examiner

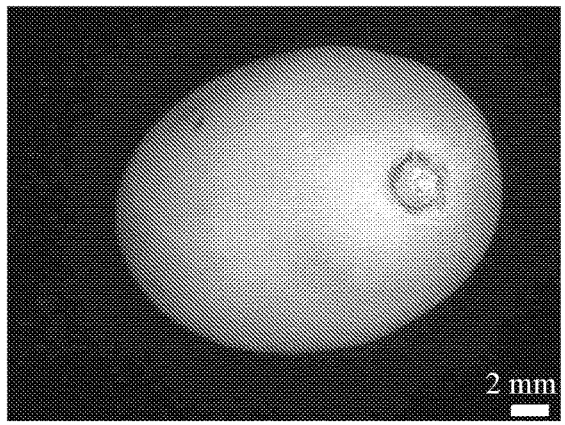
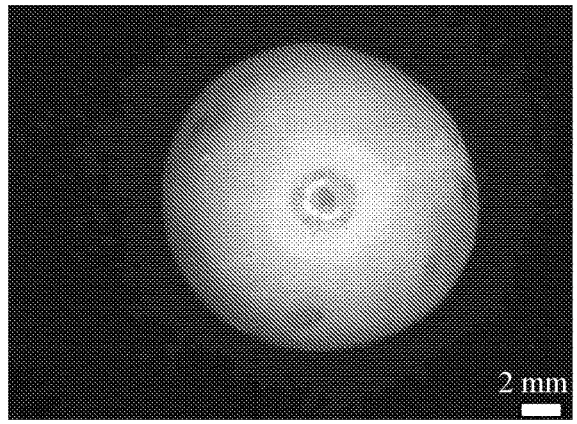
FIGURE 7A  FIGURE 7B
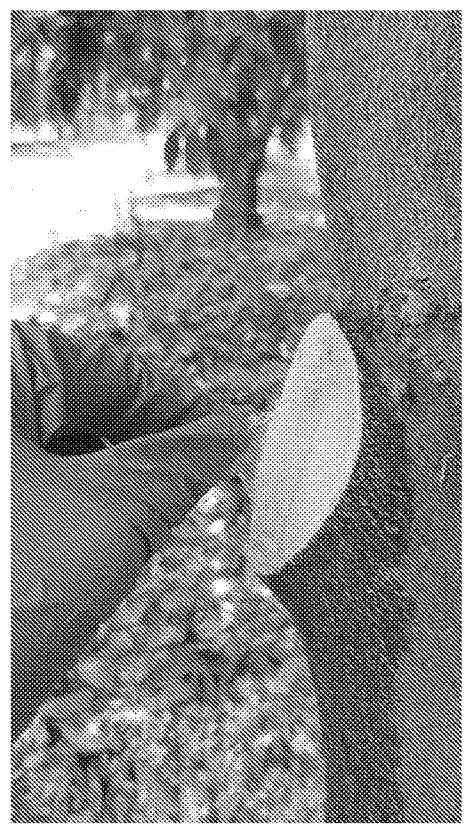
FIGURE 8A  FIGURE 8B

PROTECTIVE COATING FOR PLANTS AND POSTHARVEST PLANT MATTER

This application is a 371 filing of PCT/IL2020/050790 filed Jul. 15, 2020, claiming the priority of U.S. Provisional Patent Application No. 62/874,512 filed Jul. 16, 2019.

FIELD OF THE INVENTION

The present invention relates to methods for protecting exposed surface of postharvest plant matter and growing plants, and to postharvest plant matter comprising polysaccharide-based coatings protecting the exposed surface thereof.

BACKGROUND OF THE INVENTION

An outer bark surface of a tree consists of waterproof and decay-resistant cells that serve as a protective barrier over underlying tissue. Under the outer bark layer there is phloem, where nutrients are transported downward from the canopy, a cambium layer, which is responsible for growth and producing callous tissue, and the xylem, which transports water up the tree. Cutting through the phloem or xylem disrupts the flow of water, nutrients and sugars throughout the tree. Additionally, when a limb or twig of a plant gets wounded, either through pruning or accidentally, the wounds expose inner tissues to potential diseases, insects, and fungal or bacterial infections. It is a common practice to apply wound dressings or tree sealants following pruning. Various compounds and mixtures have been used on tree and shrub wounds to prevent drying and promote healing. Most are based on paint, shellac or asphalt-derived compounds. These compounds have generally been found to actually retard the healing process. Alternatively, there exist natural tree sealers including ingredients like collagen, aloe gel, lanolin, rosin, wax, and oil. For example, U.S. Pat. No. 5,993,891 is directed to a pruning sealant composition comprising lanolin and a drying agent effective for forming a film upon an exposed surface of the pruning sealant composition. International Patent application No. 2015/183833 is related to a composition for use in treating wounds in trees, plants and vines and a method of making the compositions and their use in treating fungal infections of pruning wounds. Said composition comprises a wax and an oil-based softening agent in a ratio of 1:10 to 1:2.

Protective coatings including some of the above-mentioned natural ingredients are also extensively used in preserving postharvest plant matter. One type of the commonly used edible coatings for extending shelf life of postharvest plant matter is based on hydrocolloids, including polysaccharides. International Patent Application No. 2001/03511 discloses a method of preparing and using a protective coating for food products such as fruits, vegetables and nuts, based on chitosan or chitosan derivatives. U.S. Pat. No. 6,068,867 to some of the inventors of the present invention is related to a protective coating for food or agricultural products made of 5-85% dried hydrocolloid gel, together with 0.2-50% of at least one natural compound isolated from the surface of the product.

The use of protective coatings is particularly attractive for extending shelf-life of ready-to-eat fruit, such as, for example, pomegranate arils or grape berries. Pomegranate is an important source of anthocyanins, phenolic compounds, vitamins and minerals. It has been reported to have many positive health benefits due to its anti-inflammatory and anti-atherosclerotic properties, as well as other benefits, such as chemoprevention [Faria A, Calhau C, 2011, Crit Rev Food Sci Nutr, 51(7):626-34]. The edible part of the fruit comprises arils, which constitute 52% of the total fruit weight and comprise 78% (w/w) juice and 22% (w/w) seeds. Pomegranate is generally consumed fresh or processed into juice, syrup, sauces, jams, or wine. However, the difficulty in peeling the fruit and separation of arils limits the consumption of fresh pomegranates by the consumers. In recent years, minimally processed ready-to-eat pomegranate arils have become popular due to their convenience, unique sensory characteristics, and health benefits. Minimal processing of pomegranate arils mainly consists of washing with sanitizing agents to reduce the initial microbial load, pH modifications, use of antioxidants, modified atmosphere packaging, and temperature control.

Production of ready-to-eat pomegranate arils on a commercial scale has become possible with modern technologies, such as, for example, ArilSystem™ of Juran Metal Works Ltd. However, the shelf life of commercially produced pomegranate arils is limited, since about 10 to 20% of the arils' external surface is damaged (e.g., cut) during the peeling and/or extraction process. As a result, fluids are exuded from the cut arils and microbial contamination takes place.

Various packages of edible grapes, generally termed table grapes, are available for purchase by a consumer. Table grapes include various constituents, such as soluble sugars, vitamin C and potassium. Moreover, table grapes contain polyphenols, flavonol glycosides and phenolic acids which are known for their antioxidant activity. Ready-to-eat grapes typically do not include a pedicel, which connects the berry to the cluster's peduncle. Removal of the grape berries from their pedicels results in an opening in the skin where the pedicel is removed with the possible result of an additional tear in the skin of the fruit, thereby exposing the flesh of the fruit to oxygen and expediting degradation of the fruit. The shelf-life of ready-to-eat grapes is further limited by weight loss, browning of the rachis and softening of berries [Costa, Lucera, Conte, Del Nobile M A, 2013, Food Technol. Biotechnol. 51 (2) 301-307].

As browning is an oxidative reaction, it can be retarded by the elimination or reduction of oxygen from the cut surface of the fruit. However, browning will still occur when oxygen is reintroduced. A popular approach for the prevention of browning in fresh cut and segmented fruit and vegetables involves the use of anti-browning agents. Anti-browning agents are compounds that act primarily on enzymes or substrates and/or products of enzymatic catalysis in a manner which inhibits pigment formation. Anti-browning agents which have been previously disclosed for use in preventing color deterioration include edible acids, such as but not limited to, ascorbic acid; their salts including, inter alia, sodium phosphate, sodium ascorbate, potassium ascorbate; and sulphites. Sulphites are very effective in the inhibition of enzymatic browning reactions, but have some disadvantages associated with their use in food, including causing adverse health effects and negatively affecting the taste of food.

European Patent Application No. 2,279,675 discloses methods of preserving fresh fruit with fresh fruit preservatives which extend the shelf life of fresh fruit, particularly fresh cut fruit, the method comprising applying to the fruit an aqueous preservative solution comprising water; calcium ions; and ascorbate ions.

International Patent Application No. 2010/010059 is directed to the method of extending shelf life of ready-to-eat fruits and vegetables via the combined use of acidification and ultraviolet light application.

Dripping and browning can be further diminished by vacuum packaging using impermeable or high gas barrier packaging materials. For example, modified atmosphere packaging (MAP) has been suggested to extend the shelf life of minimally processed arils. It was reported that minimally processed pomegranate var. Wonderful was able to be stored for 14 d at 4° C.±0.5 with the use of semipermeable film [Sepulveda E, Galletti L, Saenz C, Tapia M. 2000. Minimal processing of pomegranate var. Wonderful. In: Melgarejo P, Martinez J J, Martinez T J, editors. Symposium on production, processing and marketing of pomegranate in the Mediterranean region: advances in research and technology. Zaragosa, Spain: CIHEAM-IAMZ. p 237-242]. Vacuum packaging generally creates anaerobic conditions which may lead to anaerobic fermentation which can produce off flavors and promote the growth of pathogenic organisms. The presence of oxygen in a package or container of cut and segmented fruit pieces is essential to reduce the risk of anaerobic food pathogen growth and avoids fermentation of the fruit pieces due to the lack of oxygen supply. Fresh cut and segmented fruit pieces are biologically and physiologically active in that their tissues are living and respiring. Fresh cut fruit pieces require oxygen to continue their normal respiratory activity. A preservative method and composition for extending the shelf life of fresh cut fruit pieces which does not rely on vacuum packaging would be thus of significant benefit to the fresh fruit industry.

Shelf-life of pomegranate arils can be extended by the application of edible coatings instead of using chemical preservatives or modified atmosphere packaging. Coatings with selective permeability to gases are capable of decreasing the interchange of $O_2$ and $CO_2$ between coated fruits and the environment, slowing down the metabolism by decreasing internal $O_2$ concentration and increasing $CO_2$ concentration [Olivas G I, Barbosa-Cánovas G V, 2005, Crit Rev Food Sci Nutr, 45(7-8):657-70; Park H J, 1999, Trends in Food Science & Technology, 10(8), 254-260]. Moreover, some edible coatings improve the appearance of food and have potential to delay or even inhibit the growth of pathogenic and spoilage microorganisms [Dutta, P K, Tripathi, S, Mehrotra, G K, Dutta, J, 2009, Food Chemistry, 114(4), 1173e1182; Quintavalla S, Vicini L, 2002, Meat Science, 62(3), 373e380].

International Patent Application No. 1997/23138 discloses a method and composition for preventing enzymatic browning, microbial spoilage, reducing deterioration and/or extending the shelf life of peeled, damaged, cut or segmented fresh fruit pieces intended for chilled storage, distribution, marketing or further processing, wherein fresh, cut and peeled fruit is coated with a polysaccharide gel (sodium alginate) and then treated with a solution of a firming agent (calcium chloride), an antioxidant (ascorbic acid) and an acidulant (citric acid) to inhibit browning on the exposed surfaces of the fruit and to also maintain the pH on the surface of the fruit.

Coating compositions are typically applied to the entire surface of the peeled or cut fruit or vegetable, thereby creating a film also on the surface, which is protected by natural skin. In case of ready-to-eat pomegranate arils or grapes, only a small portion of the aril or berry surface is stripped off the natural skin and requires a protective coating in order to fill the pits or block the voids in the continuity of the skin. There exists, therefore, an unmet need for a method of selectively applying a protective coating to the exposed surface of cut or pruned plants and peeled, segmented, extracted and/or cut fruit or vegetables, in particular pomegranates and grapes.

SUMMARY OF THE INVENTION

The present invention is directed to a method of forming a protective coating on plants and/or postharvest plant matter and to the postharvest plant matter comprising said protective coating. Advantageously, the protective coating formed by the method of the invention extends shelf-life of said postharvest plant matter. One of the beneficial features of said method is that it allows forming a selective bandage on wounded vegetative tissues, without creating unnecessary film on the naturally protected surface. The present method is therefore particularly useful for extending shelf-life of cut, peeled and/or extracted fruits or vegetables, which have a partially exposed flesh.

The method of forming a protective coating according to the principles of the present invention is based upon a chemical reaction between a polysaccharide and a crosslinking agent in order to create a protective coating (also termed herein a "bandage" or "blocking bandage") on the exposed surface of the growing or harvested plant, including seed-bearing structure in flowering plants. The inventors of the present invention have surprisingly found that implementation of a specific order of method steps enables formation of a protective coating only on the damaged surface of the plant, which is not covered by natural skin, while the portion of the plant, which is covered by natural skin, remains essentially uncoated. The formed coating was found to seal the "wounds" of the cut pomegranate arils, thereby allowing to eliminate or significantly reduce exudation of fluid. Protective coating formed on the ready-to-eat grape berries efficiently blocked the pits formed following the removal of pedicels. Protective coatings were also formed on stumped tree stems, providing a gas-permeable bandage, which eliminates anaerobic microbial contamination, prevents post contamination of the exposed surface and mechanically blocks penetration of insects.

The protective coating can further include additional food-grade ingredients, such as, but not limited to, preservatives and antioxidants. The present method thus affords for the extension of shelf life of ready-to-eat fruit by preventing exudation of the fluid and further bacterial contamination by addition of food-grade preservatives. Advantageously, the protective coating covering the damaged areas is transparent and is undetectable by appearance or mouth feel. The protective coating can optionally include biocidal chemical compounds, including, inter alia, fungicides and bactericides, in order to further protect the wounded plant from a potential infection.

In one aspect the present invention provides a method for forming a protective coating on a plant tissue, the method comprising consecutive steps of: (a) providing a plant having an external surface, wherein a portion of the external surface comprises an exposed surface; (b) applying a first aqueous solution comprising a crosslinking agent, which is susceptible to crosslinking by the crosslinking agent, to the external surface of the plant; and (c) applying a second aqueous solution comprising a polysaccharide to the external surface of the plant, thereby forming a protective coating on the exposed surface of the plant following crosslinking of the polysaccharide by the crosslinking agent. In some currently preferred embodiments, the first aqueous solution and the second aqueous solution are applied to the entire external surface of the plant. In further preferred embodiments, the protective coating is formed essentially exclusively on the exposed surface of the plant.

The plant can be selected from a growing plant and a postharvest plant matter. Each possibility represents a separate embodiment of the invention.

In some embodiments, the growing plant is selected from the group consisting of a tree, shrub, vine, and herbaceous plant. Each possibility represents a separate embodiment of the invention. In some embodiments, the growing plant comprises a tree.

The postharvest plant matter can be selected from a fruit, vegetable, grain, and edible fungi. In some embodiments, the postharvest plant matter comprises a fruit. In further embodiments, said fruit comprises a berry. In a specific embodiment, said fruit is a ready-to-eat fruit. In further embodiments, said fruit is selected from pomegranate arils and grape berries. Each possibility represents a separate embodiment of the invention.

According to some embodiments, the exposed surface comprises a peeled, segmented, extracted, pruned, damaged, and/or cut plant tissue. According to further embodiments, the exposed surface is not covered by natural skin. In some particular embodiments, the exposed surface comprises a peeled, segmented, extracted, pruned, damaged, and/or cut fruit. In additional particular embodiments, the exposed surface comprises a pruned surface of a tree, shrub, vine or herbaceous plant. Each possibility represents a separate embodiment of the invention.

According to some embodiments, the postharvest plant matter comprises pomegranate arils. According to further embodiments, the pomegranate arils are extracted from the pomegranate mesocarp. According to still further embodiments, at least about 5% of the pomegranate arils' surface is exposed, wherein 100% represents the entire external surface of the total amount of arils.

According to some embodiments, the postharvest plant matter comprises grape berries. According to further embodiments, the grape berries are separated from their pedicels. According to still further embodiments, at least about 0.5% of the grape berries' surface is exposed, wherein 100% represents the entire external surface of the total amount of the grape berries.

In some currently preferred embodiments, the polysaccharide discussed in the method described herein is an anionic polysaccharide, which can be crosslinked by cations. According to further embodiments, the polysaccharide is selected from the group consisting of gellan, alginate, pectin, carrageenan and combinations and derivatives thereof. Each possibility represents a separate embodiment of the invention.

According to some embodiments, the crosslinking agent discussed in the method described herein comprises a cation selected from the group consisting of calcium ion, magnesium ion, potassium ion, barium ion, strontium ion, copper ion, lead ion, zinc ion, aluminum ion and combinations thereof. According to further embodiments, the cross-linking agent comprises an anion selected from the group consisting of chloride, lactate, carbonate, sulphate, phosphate, tartrate, and combinations thereof. According to some embodiments the crosslinking agent is selected from the group consisting of calcium chloride, calcium lactate, barium chloride, barium sulfate, aluminum chloride, strontium chloride, strontium carbonate, copper chloride, copper sulfate, lead chloride, lead sulfate, lead carbonate, zinc chloride and magnesium chloride. Each possibility represents a separate embodiment of the invention.

In some embodiments, the concentration of the polysaccharide in the second aqueous solution ranges from about 0.05% (w/w) to about 10% (w/w). According to certain embodiments the concentration of the polysaccharide ranges from about 0.5% (w/w) to about 3.5% (w/w).

According to some embodiments, the concentration of the crosslinking agent in the first aqueous solution ranges from about 0.05% (w/w) to about 25% (w/w). According to further embodiments, the concentration of the crosslinking agent ranges from about 0.1% (w/w) to about 15% (w/w). According to still further embodiments, the concentration of the crosslinking agent ranges from about 0.1% (w/w) to about 10% (w/w). According to certain embodiments, the concentration of the crosslinking agent ranges from about 1% (w/w) to about 2.5% (w/w).

The steps of applying the first and the second aqueous solutions, as mentioned hereinabove (steps (b) and (c)), can be performed by a process selected from immersing, spraying, dipping, coating, brushing, smearing, falling-film enrobing technique, and any combination thereof. Each possibility represents a separate embodiment of the invention.

In some exemplary embodiments, the aqueous solutions are applied to the external surface of the plant by immersing said plant into the aqueous solution. According to some embodiments, the step of applying the first aqueous solution comprising a crosslinking agent comprises immersing the plant into said solution for a time period ranging from about 5 seconds to about 10 min. According to a particular embodiment, the step of applying the first aqueous solution comprising a crosslinking agent comprises immersing the plant into said solution for a time period ranging from about 45 sec to about 1 min. In certain embodiments, said plant is a fruit.

According to some embodiments, the step of applying the second aqueous solution comprising a polysaccharide comprises immersing the plant into said solution for a time period ranging from about 10 sec to about 5 min. According to a particular embodiment, the step of applying the second aqueous solution comprising a polysaccharide comprises immersing the plant into said solution for a time period of about 30 seconds. In certain embodiments, said plant is a fruit.

In additional exemplary embodiments, the first and the second aqueous solutions are applied to the external surface of the plant by brushing and/or spraying. In certain embodiments, said plant is a tree.

According to a specific embodiment, the second aqueous solution comprising a polysaccharide is being continuously stirred.

According to some embodiments, the method further comprises a step of drying the plant for a time period ranging from about 5 sec to about 3 hours. According to certain embodiments, the drying time ranges from about 30 minutes to about 1 hour. According to further embodiments, the drying is performed at a temperature ranging from about 5° C. to about 80° C. According to further embodiments, the drying step is performed after the step of applying an aqueous solution comprising a polysaccharide.

According to some embodiments the method further comprises storing the postharvest plant matter at a temperature of from about −18° C. to about 25° C. In further embodiments, the method comprises storing the postharvest plant matter at about 20% to about 100% relative humidity (RH) atmosphere.

The second aqueous solution comprising a polysaccharide, the first aqueous solution comprising a crosslinking agent, or both can further comprise at least one additive selected from the group consisting of an antioxidant, food grade acidulant, preservative, pH modifier, aroma compound, colorant, sweetener, viscosity former, antifoaming agent, adhesion-promoter, plasticizer, emulsifier, surface-tension modifier, humectant, and hydrophobic component. Each possibility represents a separate embodiment of the invention. In certain related embodiments, the plant is a postharvest plant matter.

In some additional embodiments, the second aqueous solution comprising a polysaccharide, the first aqueous solution comprising a crosslinking agent, or both comprise at least one additive selected from the group consisting of an antioxidant, acidulant, preservative, viscosity former, humectant, fungicide, bactericide, adhesion-promoter, surfactant, antifoaming agent, plasticizer, emulsifier, surface-tension modifier, and hydrophobic component. In certain related embodiments, the plant is a growing plant.

According to some embodiments, the pH of the second aqueous solution comprising a polysaccharide ranges from about 3 to about 11. According to some embodiments, the pH of the first aqueous solution comprising a crosslinking agent ranges from about 2 to about 11.

In another aspect, there is provided a postharvest plant matter comprising a protective coating formed by the method according to the various embodiments as presented hereinabove. In certain embodiments, said postharvest plant matter comprises a fruit. In further embodiments, said fruit is a ready-to-eat fruit. In still further embodiments, said fruit is selected from pomegranate arils and grape berries. Each possibility represents a separate embodiment of the invention. According to some embodiments, the protective coating has a thickness ranging from about 5 um to about 3000 um. According to further embodiments, the protective coating has a thickness ranging from about 20 um to about 600 um.

In yet another aspect, the present invention provides a postharvest plant matter, comprising: a first segment, which is covered by natural skin; and a second segment, which has an exposed surface, wherein the second segment is coated by a protective coating comprising a polysaccharide and the first segment is essentially free of said protective coating.

The postharvest plant matter can be selected from a fruit, a vegetable, a grain, and edible fungi. In some embodiments, the postharvest plant matter comprises a fruit. In a specific embodiment, said fruit is a ready-to-eat fruit. In further embodiments, said fruit is selected from pomegranate arils and grape berries. Each possibility represents a separate embodiment of the invention.

In some embodiments, a single aril comprises both the first segment and the second segment. In some embodiments, a single grape berry comprises both the first segment and the second segment.

In some embodiments, the postharvest plant matter comprises pomegranate arils. In further embodiments, said arils are extracted from the pomegranate mesocarp. In still further embodiments, the second segment constitutes at least about 5% of the entire surface of the total amount of arils.

In some embodiments, the postharvest plant matter comprises grape berries. In further embodiments, the grape berries are separated from their pedicels. In still further embodiments, the second segment constitutes at least about 0.5% of the entire surface of the total amount of grape berries.

In some currently preferred embodiments, the polysaccharide being present in the protective coating described herein is an anionic polysaccharide, which can be cross-linked by cations. The polysaccharide can be selected from the group consisting of gellan, alginate, pectin, carrageenan, and combinations and derivatives thereof. Each possibility represents a separate embodiment of the invention.

In some embodiments, the polysaccharide is present in the protective coating in a weight percent ranging from about 0.5% to about 85% of the total weight of the protective coating. In some embodiments, the protective coating further comprises water. In further embodiments, water is present in the protective coating in a weight percent ranging from about 10% to about 99.5% of the total weight of the protective coating.

In some embodiments, the polysaccharide is cross-linked by a crosslinking agent. The crosslinking agent can comprise a cation selected from the group consisting of a calcium ion, magnesium ion, potassium ion, barium ion, strontium ion, copper ion, lead ion, zinc ion, aluminum ion, and combinations thereof. Each possibility represents a separate embodiment of the invention.

The protective coating can further comprise at least one additive selected from the group consisting of ascorbic acid, L-cysteine, citric acid, malic acid, fumaric acid, lactic acid, succinic acid, pyruvic acid, oxaloacetic acid, quinic acid, tartaric acid, oleic acid, linoleic acid, stearic acid, sulfuric acid, hydrofluoric acid, sodium chloride, sodium hypochlorite, sodium bisulfite, sodium carbonate, sodium hydroxide, sodium silicate, sodium phosphate, lime, potassium sorbate, sodium benzoate, potassium oleate, glucose, fructose, sucrose, sucralose, aspartame, sorbitol, sorbitan, polysorbate, glycerol, propylene glycol, propylene glycol monostearate, ethylene glycol monostearate, ethanol, locust bean gum (LBG), gum tragacanth, pullulan, POLYOX, gelatin, xanthan, guar gum, karya gum, fenugreek, lecithin, ammonium lauryl sulfate, sodium steroyl-2-lactylate, sodium alkyl sulfate, sodium hexametaphosphate, beeswax, carnauba wax, candelilla wax, Japan wax, soy wax, castor wax, bayberry wax montan wax, microcrystalline wax, paraffin wax, phosphated monoglyceride, phosphated diglyceride, acetylated monoglyceride, alkyl polyacrylate, polyether, synthetic fragrance, semi-synthetic fragrance, natural fragrance, natural-identical fragrance, synthetic pigment, semi-synthetic pigment, natural pigment, and combinations thereof. In certain embodiments, the at least one additive is selected from the group consisting of ascorbic acid, L-cysteine, citric acid, malic acid, fumaric acid, lactic acid, succinic acid, pyruvic acid, oxaloacetic acid, quinic acid, tartaric acid, oleic acid, linoleic acid, stearic acid, sulfuric acid, hydrofluoric acid, sodium chloride, sodium hypochlorite, sodium bisulfite, sodium carbonate, sodium hydroxide, sodium silicate, sodium phosphate, lime, potassium sorbate, sodium benzoate, potassium oleate, glucose, fructose, sucrose, sucralose, aspartame, sorbitol, sorbitan, polysorbate, glycerol, propylene glycol, propylene glycol monostearate, ethylene glycol monostearate, ethanol, locust bean gum (LBG), gum tragacanth, pullulan, POLYOX, gelatin, xanthan, guar gum, karya gum, fenugreek, lecithin, ammonium lauryl sulfate, sodium steroyl-2-lactylate, sodium alkyl sulfate, sodium hexametaphosphate, beeswax, carnauba wax, candelilla wax, Japan wax, soy wax, castor wax, bayberry wax montan wax, microcrystalline wax, paraffin wax, and combinations thereof. Each possibility represents a separate embodiment of the invention.

In some embodiments, the protective coating has a thickness ranging from about 5 um to about 3000 um. In certain embodiments, the protective coating has a thickness ranging from about 20 um to about 600 um.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

FIG. 4A: uncoated arils; FIG. 4B: alginate-based coating; FIG. 4C: gellan-based coating; FIG. 4D: pectin-based coating.

FIG. 3A—270 um, FIG. 3B—65 um, FIG. 3C: 556 um.

FIG. 7A: A photograph of a grape berry separated from its pedicel, wherein its exposed surface was sealed by creating a protective coating.

FIG. 7B: A photograph of a grape berry separated from its pedicel. The dimensions of the pit created by the removal of the pedicel are about 2 mm in depth and 2 mm in dimeter.

FIG. 8A: A photograph of a stumped tree stem of *Citrus sinensis* "Shamouti", which was sealed by forming a protective coating.

FIG. 8B: A photograph of a partial peeling of the wet bandage from the stumped tree stem of *Citrus sinensis* "Shamouti".

DETAILED DESCRIPTION OF THE INVENTION

Figure 1A:
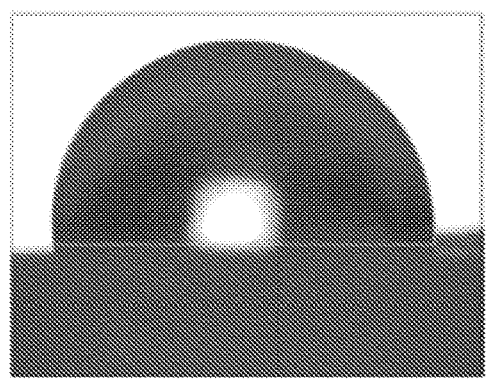
FIGS. 1A-1B: Contact angle determination by sessile drop method—water droplet on intact pomegranate aril surface (FIG. 1A) and water droplet on damaged pomegranate aril surface (FIG. 1B).

The present invention provides a method for forming a protective coating on an exposed surface of a growing plant or a postharvest plant matter. Further provided is a postharvest plant matter comprising a protective coating prepared by the method of the present invention. Additionally, the invention is directed to a postharvest plant matter comprising a partially exposed surface, wherein said exposed surface is covered by a protective coating.

Postharvest plant matter, such as fruits or vegetables, and in particular, ready-to-eat fruit can include at least partially exposed (e.g., damaged) surface following processing. The method of the present invention enables formation of a protective coating on exposed surfaces of the plant matter, without interfering with undamaged surfaces. Without wishing to being bound by theory or mechanism of action, it is contemplated that the specific order of method steps affords for the selective coating of the exposed areas. In particular, the application of a cross-linking agent solution, which is followed by the application of a polysaccharide solution, is prerequisite for confining the coating formation to the exposed plant surface only. The formed protective coating allows eliminating or significantly reducing exudation of fluid from the processed plant matter, thereby extending its shelf life. The method of the present invention can also be implemented on pruned plants, providing a protective coating against insects, fungi and/or bacteria.

Thus, in one aspect the present invention provides a method for forming a protective coating on a plant tissue, the method comprising the steps of: (a) providing a plant, wherein at least a portion of the plant has an exposed surface; (b) applying an aqueous solution comprising a crosslinking agent to the plant; and (c) applying an aqueous solution comprising a polysaccharide to the plant, thereby forming a protective coating on the exposed surface of the plant. Steps (a), (b) and (c) are consecutive steps, wherein step (c) is performed after step (b).

The aqueous solution comprising a crosslinking agent is also termed herein a "first solution" and the aqueous solution comprising a polysaccharide is also termed herein a "second solution". It is to be understood that the composition of the first solution is different than the composition of the second solution. In particular, the first solution does not contain a polysaccharide of the second solution and the second solution does not contain the crosslinking agent of the first solution.

In some embodiments, the plant has an external surface, wherein a portion of the external surface comprises an exposed surface and the remaining portion comprises a surface which is not exposed.

In some embodiments, the invention provides a method for forming a protective coating essentially exclusively on the exposed surface of the plant. The term "essentially exclusively" as used herein, refers in some embodiments to a thickness of the protective coating formed on the plant surface, which is not exposed, which is less than about 8 um. In further embodiments, the term "essentially exclusively" refers to a thickness of the protective coating formed on the plant surface, which is not exposed, which is less than about 5 um. In still further embodiments, the term "essentially exclusively" refers to a thickness of the protective coating formed on the plant surface, which is not exposed, which is less than about 1 um. In additional embodiments, the term "essentially exclusively" refers to the ratio of the protective coating thickness on the exposed surface and on the surface, which is not exposed, of about 6:1 or higher. In further embodiments, the term "essentially free of protective coating" refers to the ratio of the protective coating thickness on the exposed surface and on the surface, which is not exposed, of about 10:1 or higher. In additional embodiments, the term "essentially exclusively" refers to a protective coating, which is not formed on the surface of the plant, which is not exposed.

The plant can be selected from a growing plant and a postharvest plant matter. Each possibility represents a separate embodiment of the invention.

In some embodiments, the present invention provides a method for forming a protective coating on a surface of a growing plant. In further embodiments, the invention provides a method for forming a protective coating essentially exclusively on the exposed surface of the growing plant.

In some embodiments, the present invention provides a method for forming a protective coating on a surface of a postharvest plant matter. In further embodiments, the invention provides a method for forming a protective coating essentially exclusively on the exposed surface of the postharvest plant matter. In some embodiments, the method provides extension of shelf-life of the postharvest plant matter.

In another aspect, there is provided a postharvest plant matter, comprising a protective coating formed by the method according to the various embodiments of the invention.

In some embodiments, the growing plant is selected from the group consisting of a tree, shrub, vine, and herbaceous plant. Each possibility represents a separate embodiment of the invention. As used herein, the term "tree" refers in some embodiments, to a plant with the general form of an elongated stem, or trunk, which supports the photosynthetic leaves or branches at some distance above the ground. As used herein, the term "shrub" refers in some embodiments, to a small to medium-sized woody plant having persistent woody stems above the ground. As used herein, the term "herbaceous plant" refers in some embodiments, to a plant which has no persistent woody stem above ground. The method of forming a protective coating can be applied to any growing plant, as known in the art. In some exemplary embodiments, the growing plant is a tree. In certain embodiments, the growing plant is a citrus tree.

The term "post-harvest plant matter", as used herein, refers in some embodiments to the edible parts of postharvest plants. In some embodiments, the postharvest plant matter is selected from a fruit, a vegetable, a grain, and edible fungi. As used herein, the term "fruit" refers to the seed-bearing structure in flowering plants formed from the ovary after flowering. The term "fruit" is further meant to encompass berries. The term "vegetable", as used herein, refers to any plant part consumed for food that is not a fruit or seed. The term "grain", as used herein, refers to a small, hard, dry seed, with or without an attached hull or fruit layer, harvested for human or animal consumption and is meant to encompass cereals and legumes.

In some embodiments, the postharvest plant matter comprises a fruit. In a specific embodiment, said fruit is a ready-to-eat fruit.

The term "ready-to-eat", as used herein, refers to postharvest plant matter that has been extracted, trimmed, peeled, separated from nonedible plant parts and/or cut into a fully usable product. Said product can be further packaged for the ease of handling and to maintain its freshness.

In some embodiments, the postharvest plant matter comprises a non-ripe fruit.

The term "exposed surface", as used herein, refers in some embodiments to an accidentally or intentionally damaged surface including peeled, segmented, extracted, pruned, damaged, and/or cut plant tissue. In some embodiments, the term "peeled" refers to removal of an external peel (e.g., in a citrus fruit). In other embodiments, the term "peeled" refers to removal of epidermis/cuticule layers that are covering inner tissues. In additional embodiments, the term "exposed surface" refers to an accidentally or intentionally damaged surface including a pruned surface of a tree, shrub, vine or herbaceous plant. According to some embodiments, the exposed surface is not covered by natural skin, e.g., bark.

According to some embodiments, the exposed surface is hydrophilic. The term "hydrophilic surface", as used herein, refers, in some embodiments, to a surface having a water contact angle below about 65°. In further embodiments, the term "hydrophilic surface" refers to a surface having a water contact angle below about 60°. In still further embodiments, the term "hydrophilic surface" refers to a surface having a water contact angle below about 55°.

According to some embodiments, the surface which is not exposed is hydrophobic. The term "hydrophobic surface", as used herein, refers, in some embodiments, to a surface having a water contact angle above about 65°. In further embodiments, the term "hydrophobic surface" refers to a surface having a water contact angle above about 70°. In still further embodiments, the term "hydrophobic surface" refers to a surface having a water contact angle above about 75°.

According to some embodiments, the surface which is not exposed has a roughness factor (Ra) below about 4 µm. In further embodiments, the surface which is not exposed has Ra below about 3.5 µm.

According to some embodiments, the exposed surface of the postharvest plant matter comprises a peeled, segmented, extracted, and/or cut fruit.

In some embodiments, the ready-to-eat fruit comprises pomegranate arils. One pomegranate (*Punica granatum* L.) includes from about 200 to about 1400 arils. The seeds represent about 52% of the weight of the whole fruit. Each seed has a surrounding water-laden pulp—the edible sarcotesta that forms from the seed coat. The term "aril", as used herein, refers to the seed covered by pulp (sarcotesta). The sarcotesta of pomegranate seeds consists of epidermis cells derived from the integument. The arils are embedded in a white, spongy, astringent membrane (mesocarp). Non-limiting examples of suitable pomegranate varieties include Wonderful, Ambrosia, Gaudy, Sweet, Eversweet, Garnet Sash, Kashmir Blend, Pink Satin, Red Silk, Sharp Velvet, Parfianka, Gissarskii Rosovyi, Kar Gul, and Sirenevyl.

Pomegranate arils can be extracted from a pomegranate (and in particular from the mesocarp) manually or by an automated system. A non-limiting example of an automated system for aril extraction is ArilSystem™ of Juran Metal Works Ltd. In brief, the automated process includes curing, washing, disinfecting and brushing the fruit, which are followed by the extraction process. The arils can be extracted with the aid of air and water. The extracted arils are immersed in a bath of cold water and all other elements of the fruit are washed away.

In some embodiments, the step of providing a plant comprises providing pomegranate arils following the extraction process. According to further embodiments, the pomegranate arils are extracted from the pomegranate mesocarp.

As mentioned hereinabove, the extraction process can result in damaging of the arils' surface. Accordingly, at least a portion of the plant, and in particular, of the ready-to-eat fruit, has an exposed surface. In certain embodiments, said exposed surface is at least partially exposed surface. In further embodiments, said exposed surface is not covered by natural skin (e.g., epidermis). In certain embodiments concerning pomegranates, said exposed surface comprises damaged sarcotesta. In additional embodiments, said exposed surface comprises sarcotesta without an epidermis layer.

According to further embodiments, at least about 0.5% of the plant surface is an exposed surface, wherein 100% represents the entire surface of the plant. According to still further embodiments, at least about 1% of the plant surface is an exposed surface, at least about 5%, at least about 10%, at least about 15%, at least about 20%, at least about 25% or at least about 30% of the plant surface is an exposed surface. Each possibility represents a separate embodiment of the invention. In further embodiments, the exposed surface is not covered by natural skin.

In some embodiments, the plant comprises less than about 80% of exposed surface, wherein 100% represents the entire surface of the plant. In further embodiments, the plant comprises less than about 70% of exposed surface, less than about 60%, less than about 50% or less than about 40% of exposed surface. Each possibility represents a separate embodiment of the invention. In further embodiments, the exposed surface is not covered by natural skin.

In some embodiments, the plant comprises from about 0.5% to about 80% of exposed surface. In further embodiments, the plant comprises from about 1% to about 70% of exposed surface, from about 5% to about 60% of exposed surface, or from about 10% to about 50% of exposed surface. Each possibility represents a separate embodiment of the invention. In further embodiments, the exposed surface is not covered by natural skin.

According to further embodiments, at least about 0.5% of the fruit surface is an exposed surface, wherein 100% represents the entire surface of the total amount of the fruit. According to still further embodiments, at least about 1% of the fruit surface is an exposed surface, at least about 5%, at least about 10%, at least about 15%, at least about 20%, at least about 25% or at least about 30% of the fruit surface is an exposed surface. Each possibility represents a separate embodiment of the invention. In further embodiments, the exposed surface is not covered by natural skin. In certain embodiments, said fruit is a ready-to-eat fruit.

In some embodiments, the ready-to-eat fruit comprises less than about 40% of exposed surface, wherein 100% represents the entire surface of the total amount of the fruit. In further embodiments, the ready-to-eat fruit comprises less than about 35% of exposed surface, less than about 30%, less than about 25% or less than about 20% of exposed surface. Each possibility represents a separate embodiment of the invention. In further embodiments, the exposed surface is not covered by natural skin. In certain embodiments, said fruit is a ready-to-eat fruit.

In some embodiments, the ready-to-eat fruit comprises from about 0.5% to about 40% of exposed surface. In further embodiments, the ready-to-eat fruit comprises from about 1% to about 35% of exposed surface, from about 5% to about 30% of exposed surface, or from about from about 10% to about 25% of exposed surface. Each possibility represents a separate embodiment of the invention. In further embodiments, the exposed surface is not covered by natural skin. In certain embodiments, said fruit is a ready-to-eat fruit.

In some currently preferred embodiments, at least a portion of the pomegranate arils has an exposed surface. According to further embodiments, at least about 5% of the pomegranate arils' surface is an exposed surface, wherein 100% represents the entire surface of the total amount of arils. According to still further embodiments, at least about 10% of the pomegranate arils' surface is an exposed surface. According to yet further embodiments, at least about 15% of the pomegranate arils' surface is an exposed surface. According to still further embodiments, at least about 20% of the pomegranate arils' surface is an exposed surface. According to yet further embodiments, at least about 25% of the pomegranate arils' surface is an exposed surface. According to still further embodiments, at least about 30% of the pomegranate arils' surface is an exposed surface. In further embodiments, the exposed surface is not covered by natural skin.

In some embodiments, a single aril comprises a surface, which is covered by natural skin; and a surface, which is exposed. It is to be understood that the percentage of the arils' exposed surface, as disclosed hereinabove, can refer to the fraction of the exposed surface of individual arils or to the combined exposed surface of the total amount of arils used in the method of the invention. For example, if a plurality of pomegranate arils is used, a first portion or segment of the arils can have a surface which is covered by natural skin and a second portion or segment of the arils can have at least partially exposed surface. In such case, the percent of exposed surface can be calculated by adding up the exposed surface area of the arils having at least partially exposed surface and diving it by the entire surface area of the total amount of the arils. In some embodiments, each aril in the plurality of arils has at least partially exposed surface. In certain such embodiments, the percent of exposed surface can be calculated by adding up the exposed surface area of the total amount of arils and dividing it by the entire surface area of the total amount of the arils.

In some embodiments, the pomegranate arils comprise less than about 40% of exposed surface, wherein 100% represents the entire surface of the total amount of the arils. In further embodiments, the pomegranate arils comprise less than about 35% of exposed surface, less than about 30%, less than about 25% or less than about 20% of exposed surface. Each possibility represents a separate embodiment of the invention. In further embodiments, the exposed surface is not covered by natural skin.

In some embodiments, the pomegranate arils comprise from about 5% to about 40% of exposed surface. In further embodiments, the pomegranate arils comprise from about 5% to about 35% of exposed surface, from about 5% to about 30% of exposed surface, or from about from about 5% to about 25% of exposed surface. Each possibility represents a separate embodiment of the invention. In further embodiments, the exposed surface is not covered by natural skin.

In some embodiments, the ready-to-eat fruit comprises grape berries. A grape is a fruit, botanically a berry, of the deciduous woody vines of the flowering plant genus Vitis. Grapes are a type of fruit that grow in clusters of 15 to 300 grape berries. The skin of the grape berry is also known as the exocarp. It is covered by a waxy layer called the cuticle, which controls, inter alia, water loss of the grape berry. The stalk extending out to hold the grape cluster is known as the bunch stem or peduncle while the stem of the individual grape berry is the pedicel. Processing of the ready-to-eat grapes typically includes removal of the pedicel, which results in an opening in the natural skin where the pedicel is removed with the possible result of an additional tear in the cuticle and/or exocarp.

The grapes can be selected from white, red, rose, as well as, hybrid grape varieties.

In some embodiments, the step of providing ready-to-eat fruit comprises providing grape berries following the separation process of the pedicels. Accordingly, in some embodiments, at least a portion of the grape berries has an exposed surface. In certain embodiments, said exposed surface is at least partially exposed surface. In further embodiments, said exposed surface is not covered by natural skin (e.g., exocarp and/or cuticle).

According to further embodiments, at least about 0.5% of the grape berries' surface is an exposed surface, wherein 100% represents the entire surface of the total amount of grape berries. According to still further embodiments, at least about 0.75% of the grape berries' surface is an exposed surface. According to yet further embodiments, at least about 1% of the grape berries' surface is an exposed surface. According to still further embodiments, at least about 2.5% of the grape berries' surface is an exposed surface. According to yet further embodiments, at least about 5% of the grape berries' surface is an exposed surface. In further embodiments, the exposed surface is not covered by natural skin.

In some embodiments, a single grape berry comprises a surface, which is covered by natural skin; and a surface, which is exposed. It is to be understood that the percentage of the grape berries' exposed surface, as disclosed hereinabove, can refer to the fraction of the exposed surface of individual berries or to the combined exposed surface of the total amount of berries used in the method of the invention. In some embodiments, each grape berry in the plurality of berries used in the method of the invention has a partially exposed surface. In certain such embodiments, the percent of exposed surface can be calculated by adding up the exposed surface area of the total amount of grape berries and dividing it by the entire surface area of the total amount of the berries.

In some embodiments, the grape berries comprise less than about 30% of exposed surface, wherein 100% represents the entire surface of the total amount of the arils. In further embodiments, the pomegranate arils comprise less than about 20% of exposed surface, less than about 15%, or less than about 10% of exposed surface. Each possibility represents a separate embodiment of the invention. In further embodiments, the exposed surface is not covered by natural skin.

In some embodiments, the grape berries comprise from about 0.5% to about 30% of exposed surface. In further embodiments, the grape berries comprise from about 0.75% to about 20% of exposed surface, from about 1% to about 15% of exposed surface, or from about from about 2.5% to about 10% of exposed surface. Each possibility represents a separate embodiment of the invention. In further embodiments, the exposed surface is not covered by natural skin.

Additional fruits within the scope of the present invention, which can be in a form of ready-to-eat fruits, include citrus fruits, such as, but not limited to, orange, tangerine, clementine, tangelo, pomelo, and grapefruit, pome fruits, such as, for example, apples and pears, and berries, such as, but not limited to, strawberry, blackberry, dewberries, raspberries, blueberry and boysenberry.

In some embodiments, the postharvest plant matter comprises a vegetable. In a specific embodiment, said vegetable is a ready-to-eat vegetable. Non-limiting examples of vegetables, which can be in a form of a ready-to-eat vegetable, include carrot, cucumber, celery, and radish.

The aqueous solution in step (c) comprises a polysaccharide. The term "polysaccharide", as used herein, is meant to include compounds made up of hundreds or even thousands of monosaccharide units per molecule. These units are held together by glycoside linkages. Their molecular weights are normally higher than about 5,000 and up to the millions of Daltons. They are normally naturally occurring polymers. The polysaccharide can include straight or branched chains. Polysaccharides suitable for use in the present invention should be susceptible to crosslinking by a crosslinking agent. In certain embodiments, said crosslinking proceeds through ionic interaction. The polysaccharide should further have one or more reactive hydroxy groups. Non-limiting examples of polysaccharides suitable for use in the method of the present invention include: gellan, alginate, pectin, carrageenan, agar, agarose, arabinoxylan, carboxymethylcellulose, cellulose, curdlan, β-glucan, starch, gum arabic, gum tragacanth, tamarind gum, fenugreek gum, cassia gum, and tara gum.

In some currently preferred embodiments, the polysaccharide is an anionic polysaccharide. In further embodiments, the polysaccharide is acidic.

In certain embodiments, the polysaccharide is selected from gellan, alginate, pectin, carrageenan, and combinations and derivatives thereof. Each possibility represents a separate embodiment of the present invention.

The term "derivative", as used herein, refers, in some embodiments, to fractions of a polysaccharide and/or modified polysaccharides (including chemical and enzymatic modification).

In some embodiments, the aqueous solution in step (c) comprises an additional polysaccharide, which can be used as a viscosity former or as a surface tension modifier, as explained hereinbelow.

In some exemplary embodiments, the polysaccharide is gellan (also termed herein "gellan gum"). Gellan gum is a linear anionic polysaccharide produced by the microorganism *Pseudomonas elodea*. Gellan is a polysaccharide that can be crosslinked by ionic interactions, for example, by calcium ions. Gellan gums can be divided into two types: low acyl gellan and high acyl gellan. In some exemplary embodiments, the polysaccharide is a low acyl gellan gum.

In further exemplary embodiments, the polysaccharide is alginate. Alginate is a polysaccharide with mannuronic and glucuronic acid residues. Alginate is a polysaccharide that can be crosslinked by ionic interactions, for example, by calcium ions. Alginate useful in the method of the present invention can be in a form of a free acid or a salt. In certain embodiments, alginate is in the form of an alkali metal salt, such as, but not limited to sodium or potassium. In some exemplary embodiments, alginate is in the form of sodium alginate salt from brown algae. The term "alginate" includes alginate in its normal sense, as well as fractions and derivatives thereof, as well as modified alginates (e.g. chemically modified alginates and enzymatically modified alginates). By way of example, alginate can be a derivatized alginate, a degraded (such as partially degraded) alginate or a modified alginate. An example of a chemically modified alginate and/or alginate derivative is propylene glycol alginate (PGA). Accordingly, in some embodiments, the polysaccharide includes PGA.

In additional exemplary embodiments, the polysaccharide is pectin. Pectin is a structural heteropolysaccharide contained in the primary cell walls of terrestrial plant. The principal constituent of pectin is D-Galacturonic acid but some neutral sugars are also commonly present in pectin. The D-galacturonic acid units are linked together by $\alpha(1\text{-}4)$ glycosidic linkages. Pectin can differ in degree of methyl esterification (DE). High methylester (HM) pectin, DE higher than 50, forms gels and structured liquids under conditions of low pH and low water activity, while low methylester (LM) pectin, DE lower than 50, forms gels in the presence of divalent cations, such as calcium. In some exemplary embodiments, the polysaccharide is a low methylester pectin (LMP). The term "pectin" includes pectin in its normal sense, as well as fractions and derivatives thereof, as well as modified pectins (e.g., chemically modified pectins and enzymatically modified pectins). By way of example, pectin can be a derivatized pectin, a degraded (such as partially degraded) pectin or a modified pectin. An example of a chemically modified pectin and/or a pectin derivative is pectin that has been chemically treated, e.g., amidated. Accordingly, in some embodiments, the polysaccharide includes amidated pectin. An example of an enzymatically modified pectin is pectin that has been treated with pectin methyl esterase (PME).

The aqueous solution in step (b) comprises a crosslinking agent. Without wishing to being bound by theory or mechanism of action, it is contemplated that the application of the crosslinking agent to the surface of a plant, such as, for example, a ready-to-eat fruit, prior to the application of the polysaccharide affords for the formation of the protective coating on the exposed surface of the plant without creating said coating on the surface covered by natural skin (e.g., epidermis, cuticle and/or exocarp). Even if the exposed surface of the plant naturally contains a certain amount of soluble salts (i.e., contains cations), the crosslinking agent is essential for increasing the concentration of these cations to at least a minimal concentration that enables efficient crosslinking of the hydrocolloid, i.e., reaction that is leading to a formation of a crosslinked polysaccharide-based film. Without further wishing to being bound by theory or mechanism of action, crosslinking of the polysaccharide by the crosslinking agent allows formation of chemically and mechanically stable films. Such wet films can be further dried, for example, at ambient temperatures and RH, while still remaining sufficiently adhered to the exposed surface of the plant. It is to be understood though, that even a dried protective costing contains a certain amount of moisture, wherein water content depends on the type of the plant tissue. For example, in a pomegranate aril, the wet interior contacts the created film and some negligible diffusion of water molecules from the inside to protective coating can occur.

According to some embodiments, the crosslinking agent comprises a monovalent, a divalent or a trivalent cation. In further embodiments, the monovalent cation is an alkali metal cation, such as, for example a potassium cation. In still further embodiments, the divalent cation is an alkali earth metal cation, selected from, but not limited to, a calcium cation, potassium cation, barium cation, strontium cation, copper cation, lead cation, zinc cation, and magnesium cation. In certain embodiments, the trivalent cation is aluminum. In some exemplary embodiments, the cation is calcium.

The crosslinking agent suitable for use in the method of the present invention can be in a form of an alkali or alkali earth metal salt. Accordingly, in some embodiments, the aqueous solution in step (b) further comprises an anion. Non-limiting examples of suitable anions which form a salt with the crosslinking-agent cation include chloride, lactate, carbonate, sulphate, phosphate, and tartrate. The crosslinking agent in a form of a salt can thus be selected from calcium chloride, calcium lactate, calcium carbonate, calcium phosphate, calcium tartrate, magnesium chloride, magnesium lactate, magnesium carbonate, magnesium phosphate, magnesium tartrate, aluminum chloride and potassium chloride. In certain embodiments, the cross-linking agent is selected from calcium chloride, calcium lactate, barium chloride, barium sulfate, barium chloride, barium sulfate, strontium chloride, strontium carbonate, copper chloride, copper sulfate, lead chloride, lead sulfate, lead carbonate, zinc chloride and magnesium chloride. Each possibility represents a separate embodiment of the invention. In some exemplary embodiments, the cross-linking agent is calcium chloride. A person skilled in the art will readily realize that the crosslinking agent is present in the aqueous solution in a form of a dissociated salt.

The concentration of the polysaccharide in the aqueous solution can range from about 0.05% (w/w) to about 10% (w/w). According to some embodiments, the concentration of the polysaccharide ranges from about 0.1% (w/w) to about 10% (w/w). According to further embodiments, the concentration of the polysaccharide ranges from about 0.25% (w/w) to about 7.5% (w/w). According to yet further embodiments the concentration of the polysaccharide ranges from about 0.5% (w/w) to about 5% (w/w). According to still further embodiments the concentration of the polysaccharide ranges from about 0.5% (w/w) to about 3.5% (w/w). In yet further embodiments the concentration of the polysaccharide ranges from about 0.75% (w/w) to about 2.5% (w/w). In additional embodiments, the concentration of the polysaccharide ranges from about 0.05% (w/w) to about 2.5% (w/w). In certain embodiments, the concentration of the polysaccharide ranges from about 0.5% (w/w) to about 10% (w/w).

In some embodiments, step (c) comprises applying an aqueous solution comprising gellan to the surface of the plant. In further embodiments, concentration of gellan in said aqueous solution ranges from about 0.05% (w/w) to about 2.5% (w/w). In some exemplary embodiments, the concentration of alginate is about 0.5% (w/w).

In some embodiments, step (c) comprises applying an aqueous solution comprising alginate to the surface of the plant. In further embodiments, concentration of alginate in said aqueous solution ranges from about 0.5% (w/w) to about 5% (w/w). In some exemplary embodiments, the concentration of alginate is about 1% (w/w).

In some embodiments, step (c) comprises applying an aqueous solution comprising pectin to the surface of the plant. In further embodiments, concentration of pectin in said aqueous solution ranges from about 0.5% (w/w) to about 10% (w/w). In some exemplary embodiments, the concentration of pectin is about 3.5% (w/w).

The concentration of the crosslinking agent in the aqueous solution can range from about 0.05% (w/w) to about 25% (w/w). According to some embodiments, the concentration of the crosslinking agent ranges from about 0.25% (w/w) to about 15% (w/w). According to further embodiments, the concentration of the crosslinking agent ranges from about 0.25% (w/w) to about 10% (w/w). According to still further embodiments, the concentration of the crosslinking agent ranges from about 0.25% (w/w) to about 7.5% (w/w). According to yet further embodiments, the concentration of the crosslinking agent ranges from about 0.5% (w/w) to about 5% (w/w). According to still further embodiments, the concentration of the crosslinking agent ranges from about 1% (w/w) to about 2.5% (w/w).

The aqueous solutions used in the method of the invention can comprise additional ingredients, which can facilitate shelf life extension of the postharvest plant matter and improve its visual, as well, as sensory appearance. Non-limiting examples of such ingredients include an antioxidant, food grade acidulant, preservative, pH modifier, aroma compound, colorant, sweetener, viscosity former, antifoaming agent, adhesion-promoter, emulsifier, plasticizer, surface-tension modifier, humectant, surfactant, and hydrophobic component. The terms "emulsifier", "surfactant", and "surface-tension modifier" can be used interchangeably.

According to some embodiments, the antioxidant is selected from the group consisting of ascorbic acid, L-cysteine, polyphenol, and combinations thereof.

According to some embodiments, the food grade acidulant is selected from the group consisting of ascorbic acid, citric acid, malic acid, fumaric acid, lactic acid, succinic acid, pyruvic acid, oxaloacetic acid, quinic acid, tartaric acid, and combinations thereof.

According to some embodiments, the preservative is selected from the group consisting of sodium chloride, potassium sorbate, sodium hypochlorite, sodium benzoate, sodium bisulfite, and combinations thereof.

According to some embodiments, the pH modifier is selected from sodium carbonate, sodium hydroxide, sodium silicate, sodium phosphate, lime, sulfuric acid, and hydrofluoric acid.

The aroma compound can be selected from synthetic, semi synthetic, natural and natural-identical fragrances.

In some embodiments, the colorant is selected from synthetic, semi-synthetic, and natural pigments.

The sweetener can be selected from monosaccharides, such as, glucose and fructose; disaccharides, such as sucrose; and artificial sweeteners, including sucralose and aspartame.

According to some embodiments, the viscosity former is selected from glycerol, a polysaccharide or a hydrocolloid.

Non-limiting examples of anti-foaming agents suitable for use in the aqueous compositions of the invention include oil based defoamers, silicone based defoamers and alkyl polyacrylates.

Non-limiting examples of adhesion-promoters include natural gums, e.g. locust bean gum (LBG), gum tragacanth, polyoxes, cationic water-soluble polymers, gelatin, xanthan, guar gum, karya gum and fenugreek.

Non-limiting examples of emulsifiers include lecithin, polysorbate, ethylene glycol monostearate, ammonium lauryl sulfate, sodium steroyl-2-lactylate, potassium oleate, propylene glycol monostearate, sodium alkyl sulfate, oleic acid and polyglycol.

A surface tension modifier, can be, for example, ethanol, a polysaccharide or a hydrocolloid.

Plasticizers can be selected from glycols and polyethers, benzoates and acetylated monoglycerides.

Non-limiting examples of humectants include polyols, such as, but not limited to, glycerin, propylene glycol, sorbitol, and sodium hexametaphosphate.

Hydrophobic components which are useful in the aqueous compositions of the invention include waxes, such as, e.g., beeswax and carnauba wax, oils and fats, such as oleic acid, linoleic acid, and stearic acid.

Surfactants can be selected from nonionic surfactant, such as sorbitan and polysorbates, and anionic surfactant, such as phosphated mono and diglycerides.

In some embodiments, the aqueous solution comprising a polysaccharide, the aqueous solution comprising a crosslinking agent, or both comprise at least one additive selected from the group consisting of antioxidant, food grade acidulant, preservative, pH modifier, aroma compound, colorant, sweetener, viscosity former, antifoaming agent, adhesion-promoter, plasticizer, emulsifier, surface-tension modifier, humectant, and hydrophobic component. In certain embodiments, the aqueous solution comprising a polysaccharide comprises at least one additional ingredient, which facilitates shelf life extension, as detailed hereinabove. In further embodiments, the plant is a postharvest plant matter.

The polysaccharide and/or crosslinking solutions for the formation of a protective coating on a growing plant can further include fungicide and bactericide agents. Non-limiting examples of a suitable fungicide include natural fungicides, such as neem oil and rosemary oil, and sulfur containing fungicides, such as copper sulphate, and Imzalil. Non-limiting examples of a suitable bactericide include active chlorine containing bactericides, such as hypochlorites and chloramines, and active oxygen containing bactericides, such as peroxides. In further embodiments, the plant is a growing plant.

In some embodiments, the aqueous solution comprising a polysaccharide, the aqueous solution comprising a crosslinking agent, or both comprise at least one additive selected from the group consisting of an antioxidant, acidulant, preservative, viscosity former, humectant, fungicide, bactericide, adhesion-promoter, surfactant, antifoaming agent, plasticizer, emulsifier, surface-tension modifier, humectant, and hydrophobic component.

The aqueous solutions can further contain additional substances such as, but are not limited to polydimethylsiloxane (PDMS), sodium propionate, calcium propionate, benzoic acid, mannitol, high laurate canola oil (laurical™), Astral R and HUMKOTE®. Each possibility represents a separate embodiment of the present invention.

According to some embodiments, the pH of the aqueous solution comprising a polysaccharide ranges from about 3 to about 11. According to some embodiments, the pH of the aqueous solution comprising a cross-linking agent ranges from about 2 to about 11.

The aqueous solution comprising a crosslinking agent (in step (b)) and/or the aqueous solution comprising a polysaccharide (in step (c)) can be applied to the entire surface of the plant, whereas the protective coating is formed only on the exposed surface of the plant.

The step of applying an aqueous solution comprising a crosslinking agent (step (b)), the step of applying an aqueous solution comprising a polysaccharide (step (c)) or both can be performed by a process selected from immersing, spraying, falling-film enrobing technique, coating, dipping, brushing, smearing, and combinations thereof. Each possibility represents a separate embodiment of the invention. In some currently preferred embodiments said steps are performed by immersing the postharvest plant matter into the respective aqueous solutions. The immersion process can be fully automated, as known in the art. In certain embodiments, the postharvest plant matter comprises fruit. In further embodiments, immersion of the fruit into the aqueous solution is performed following the extraction or separation steps included in the processing of the fruit. In further embodiments, said fruit is a ready-to-eat fruit In some exemplary embodiments, the aqueous solution comprising a crosslinking agent is applied to the postharvest plant matter surface by immersing said plant matter into the aqueous solution comprising said crosslinking agent. According to further embodiments, the step of applying an aqueous solution comprising a crosslinking agent comprises immersing the plant matter into said solution for a time period ranging from about 5 sec to about 10 min. According to still further embodiments, the step of applying an aqueous solution comprising a crosslinking agent comprises immersing the plant matter into said solution for a time period ranging from about 30 sec to about 2 min. According to a particular embodiment, the step of applying an aqueous solution comprising a crosslinking agent comprises immersing the plant matter into said solution for a time period ranging from about 45 sec to about 1 min. According to a particular embodiment, the step of applying an aqueous solution comprising a crosslinking agent comprises immersing the plant matter into said solution for a time period ranging from about 45 sec to about 1 min. The aqueous solution comprising the crosslinking agent can be continuously stirred. In certain embodiments, said postharvest plant matter is a fruit. In further embodiments, said fruit is a ready-to-eat fruit In some exemplary embodiments, the aqueous solution comprising a polysaccharide is applied to the fruit surface by immersing said fruit into the aqueous solution comprising said polysaccharide. According to further embodiments, the step of applying an aqueous solution comprising a polysaccharide comprises immersing the fruit into said solution for a time period ranging from about 2 sec to about 5 min. According to still further embodiments, the step of applying an aqueous solution comprising a polysaccharide comprises immersing the fruit into said solution for a time period ranging from about 10 sec to about 5 min. According to yet further embodiments, the step of applying an aqueous solution comprising a polysaccharide comprises immersing the fruit into said solution for a time period ranging from about 10 sec to about 1 min. According to still further embodiments, the step of applying an aqueous solution comprising a polysaccharide comprises immersing the fruit into said solution for a time period ranging from about 20 sec to about 40 sec. According to a particular embodiment, the step of applying an aqueous solution comprising a polysaccharide comprises immersing the fruit into said solution for a time period of about 30 seconds. According to a specific embodiment, the aqueous solution comprising a polysaccharide is being continuously stirred during the immersion process.

In some embodiments, the step of applying an aqueous solution comprising a crosslinking agent (step (b)) and the step of applying an aqueous solution comprising a polysaccharide (step (c)) are performed by brushing and/or spraying. In certain such embodiments, the plant is a growing plant.

According to some embodiments, the step of applying an aqueous solution comprising a polysaccharide (step (c)) is repeated to achieve the desired coating thickness and/or properties. It is to be understood, that the initial application of the crosslinking agent solution in step (b) can be sufficient to provide cross-linking of the polysaccharide, which is repeatedly applied to the plant surface. The type of the polysaccharide in the solutions of step (c) in the repeated applications can be the same or different. For example, the method of the invention can include application of a solution comprising gellan as an initial step (c) and application of a solution comprising alginate as a repeated step (c).

In some additional embodiments, the step of applying an aqueous solution comprising a crosslinking agent (step (b)) and the step of applying an aqueous solution comprising a polysaccharide (step (c)) are repeated sequentially to achieve the desired coating thickness and/or properties. The type of the polysaccharide in the solutions of step (c) in the repeated applications can be the same or different. For example, the method of the invention can include application of a solution comprising gellan as an initial step (c) and application of a solution comprising alginate as a repeated step (c). The type of the cross-linking agent in the solutions of step (b) in the repeated applications can also be the same or different. The type of the crosslinking agent can be selected in accordance with the polysaccharide used in step (c). Steps (b) and (c) can be repeated 2-10 times. The repeated application of solutions of steps (b) and (c) can be preceded by a drying step between step (c) of a first round of steps and step (b) of the next round of steps. It is to be understood though, that the initial round of steps (b) and (c) includes step (b) (application of an aqueous solution comprising a crosslinking agent), as a first step (which precedes step (c)), in order to form the protective coating solely on the exposed surface of the plant.

Preferably, the plant is not dried between the application steps (b) and (c).

According to some embodiments, the method further comprises a step of drying the plant for a time period ranging from about 5 sec to about 3 hours. According to further embodiments, the drying time ranges from about 1 minute to about 2 hours. According to certain embodiments, the drying time ranges from about 10 minutes to about 1 hour. According to some embodiments, the drying is performed at a temperature ranging from about 5° C. to about 80° C. According to further embodiments, the drying is performed at a temperature ranging from about 15° C. to about 80° C. According to still further embodiments, the drying is performed at a temperature ranging from about 15° C. to about 40° C. In certain embodiments, the drying is performed at ambient temperature. In other embodiments, the drying is performed at temperatures above ambient temperature, which can be achieved by using drying tunnels or drying rooms. In certain such embodiments, the drying temperature ranges from about 30° C. to about 80° C.

In some currently preferred embodiments, the drying is performed following step (c). The drying can be performed using sieve with absorbent paper. In additional embodiments, the drying is an air-blown drying using a fan.

According to some embodiments the method further comprises storing the postharvest plant matter at a temperature of from about −18° C. to about 30° C. In further embodiments, the method comprises storing the postharvest plant matter at about 20% to about 100% relative humidity atmosphere. In still further embodiments, the method comprises storing the postharvest plant matter at about 40% to about 90% relative humidity atmosphere.

The method according to the principles of the present invention provides protective coating with a controllable thickness. The thickness of the coating obtainable by the method of the invention depends, inter alia, on the polysaccharide and/or crosslinking agent concentrations in the respective aqueous solutions and on the application time of said solutions. The thickness can thus be conveniently fine-tuned based on the type of plant and desired application. For example, if the protective coating is applied on a ready-to-eat fruit, the thickness can be varied based on the desired shelf-life, and/or fruit appearance and feel. Typically, the coating has a thickness ranging from about 5 um to about 3000 um. According to some embodiments, the protective coating has a thickness ranging from about 10 um to about 1000 um. According to further embodiments, the protective coating has a thickness ranging from about 20 um to about 600 um. According to still further embodiments, the protective coating has a thickness ranging from about 50 um to about 400 um. According to yet further embodiments, the protective coating has a thickness ranging from about 100 um to about 200 um. The thickness can be measured by analyzing the coated plant images by appropriate software.

The method of the present invention can further include a step of packaging the ready-to-eat fruit having a protective coating. The fruit can be packaged following the drying step. The packaging can by performed by a modified atmosphere packaging technique, as known in the art. In further embodiments, the ready-to-eat fruit is packed into containers with perforated plastic covering. In additional embodiments, the packaging allows maintaining the aerobic conditions (i.e., 2-10% oxygen) required for regular but low respiratory activity of the fruit.

In yet another aspect, the present invention provides a postharvest plant matter, comprising: a first segment, which is covered by natural skin; and a second segment, which has an exposed surface, wherein the second segment is coated and/or covered by a protective coating comprising a polysaccharide and the first segment is essentially free of said protective coating.

The term "essentially free of protective coating" as used herein, refers in some embodiments to a thickness of the protective coating which is less than about 8 um. In further embodiments, the term "essentially free of protective coating" refers to a thickness of the protective coating which is less than about 5 um. In still further embodiments, the term "essentially free of protective coating" refers to a thickness of the protective coating which is less than about 1 um. In additional embodiments, the term "essentially free of protective coating" refers to the ratio of the protective coating thickness on the second segment and on the first segment of about 6:1 or higher. In further embodiments, the term "essentially free of protective coating" refers to the ratio of the protective coating thickness on the second segment and on the first segment of about 10:1 or higher.

The postharvest plant matter can be selected from a fruit, a vegetable, a grain, and edible fungi. In some embodiments, the present invention provides a fruit, comprising: a first segment of the fruit, which is covered by natural skin; and a second segment of the fruit, which has an exposed surface, wherein the second segment of the fruit is coated by a protective coating comprising a polysaccharide and the first segment of the fruit is essentially free of said protective coating. In certain embodiments, the fruit is a ready-to-eat-fruit. In some embodiments, the fruit is non-ripe fruit.

In some embodiments, the postharvest plant matter is a vegetable. In further embodiments, the vegetable is a ready-to-eat vegetable.

In some embodiments, the postharvest plant matter comprises a plurality of plants of the same type, wherein the first segment of plants is covered by natural skin, and the second segment of plants has an exposed surface. In certain embodiments, said exposed surface is at least partially exposed surface.

Additionally or alternatively, a single unit of the postharvest plant matter, such as, for example, a single fruit can include a first segment, which is covered by natural skin, and a second segment, having an exposed surface.

In some embodiments, the first segment constitutes at least about 20% of the entire surface of the total amount of plant matter. In further embodiments, the first segment constitutes at least about 30% of the entire surface of the total amount of the plant matter, at least about 40%, or at least about 50%. Each possibility represents a separate embodiment of the invention.

In some embodiments, the first segment constitutes less than about 99.5% of the entire surface of the total amount of the plant matter. According to further embodiments, the first segment constitutes less than about 99% of the entire surface of the total amount of the plant matter. According to still further embodiments, the first segment constitutes less than about 95% of the entire surface of the total amount of the plant matter, or less than about 90%. Each possibility represents a separate embodiment of the invention.

In some embodiments, the first segment constitutes from about 20% to about 99.5% of the entire surface of the total amount of the plant matter. In further embodiments, the second segment constitutes from about 30% to about 99% of the entire surface of the total amount of the plant matter, from about 40% to about 95%, or from about 50% to about 90%. Each possibility represents a separate embodiment of the invention.

In some embodiments, the second segment constitutes at least about 0.5% of the entire surface of the total amount of the plant matter. According to further embodiments, the second segment constitutes at least about 1% of the entire surface of the total amount of the plant matter. According to still further embodiments, the second segment constitutes at least about 5% of the entire surface of the total amount of the plant matter, or at least about 10%. Each possibility represents a separate embodiment of the invention.

In some embodiments, the second segment constitutes less than about 80% of the entire surface of the total amount of the plant matter. In further embodiments, the second segment constitutes less than about 70% of the entire surface of the total amount of the plant matter, less than about 60%, or less than about 50%. Each possibility represents a separate embodiment of the invention.

In some embodiments, the second segment constitutes from about 0.5% to about 80% of the entire surface of the total amount of the plant matter. In further embodiments, the second segment constitutes from about 1% to about 70% of the entire surface of the total amount of the plant matter, from about 5% to about 60%, or from about 10% to about 50%. Each possibility represents a separate embodiment of the invention.

The plant matter can be a fruit, preferably, a ready-to-eat fruit. In some embodiments, said ready-to-eat fruit is selected from pomegranate arils and grape berries, as disclosed in detail hereinabove. The fruits can be further selected from citrus fruits, pome fruits and berries. Non-limiting examples of citrus fruits include orange, tangerine, clementine, tangelo, pomelo, and grapefruit. Pome fruits can be selected, inter alia, from apples or pears. Non-limiting examples of berries include strawberry, blackberry, blueberry and boysenberry. Each possibility represents a separate embodiment of the invention.

In some embodiments, a single aril comprises both the first segment of the fruit and the second segment of the fruit. In some embodiments, a single berry comprises both the first segment of the fruit and the second segment of the fruit.

In some embodiments, the ready-to-eat fruit comprises pomegranate arils. In further embodiments, said arils are extracted from the pomegranate mesocarp, as explained in detail hereinabove.

In some embodiments, the first segment of the fruit constitutes at least about 20% of the entire surface of the total amount of arils. In further embodiments, the first segment of the fruit constitutes at least about 30% of the entire surface of the total amount of arils, at least about 40%, at least about 50% or at least about 60%. Each possibility represents a separate embodiment of the invention.

In some embodiments, the first segment of the fruit constitutes less than about 95% of the entire surface of the total amount of arils. According to further embodiments, the first segment of the fruit constitutes less than about 90% of the entire surface of the total amount of arils. According to still further embodiments, the first segment of the fruit constitutes less than about 85% of the entire surface of the total amount of arils, less than about 80%, less than about 75%, or less than about 70%. Each possibility represents a separate embodiment of the invention.

In some embodiments, the first segment of the fruit constitutes from about 20% to about 95% of the entire surface of the total amount of arils. In further embodiments, the second segment of the fruit constitutes from about 30% to about 90% of the entire surface of the total amount of arils, from about 40% to about 85%, or from about 50% to about 80%. Each possibility represents a separate embodiment of the invention.

In some embodiments, the second segment of the fruit constitutes at least about 5% of the entire surface of the total amount of arils. According to further embodiments, the second segment of the fruit constitutes at least about 10% of the entire surface of the total amount of arils. According to still further embodiments, the second segment of the fruit constitutes at least about 15% of the entire surface of the total amount of arils, at least about 20%, at least about 25%, or at least about 30%.

In some embodiments, the second segment of the fruit constitutes less than about 80% of the entire surface of the total amount of arils. In further embodiments, the second segment of the fruit constitutes less than about 70% of the entire surface of the total amount of arils, less than about 60%, less than about 50% or less than about 40%. Each possibility represents a separate embodiment of the invention.

In some embodiments, the second segment of the fruit constitutes from about 5% to about 80% of the entire surface of the total amount of arils. In further embodiments, the second segment of the fruit constitutes from about 10% to about 70% of the entire surface of the total amount of arils, from about 15% to about 60%, or from about 20% to about 50%. Each possibility represents a separate embodiment of the invention.

In some embodiments, the ready-to-eat fruit comprises grape berries. In further embodiments, the grape berries are separated from their pedicels, as explained hereinabove.

In some embodiments, the first segment of the fruit constitutes at least about 70% of the entire surface of the total amount of grape berries. In further embodiments, the first segment of the fruit constitutes at least about 80% of the entire surface of the total amount of grape berries, at least about 85%, or at least about 90%. Each possibility represents a separate embodiment of the invention.

In some embodiments, the first segment of the fruit constitutes less than about 99.5% of the entire surface of the total amount of grape berries. According to further embodiments, the first segment of the fruit constitutes less than about 99.25% of the entire surface of the total amount of grape berries. According to still further embodiments, the first segment of the fruit constitutes less than about 99% of the entire surface of the total amount of grape berries, less than about 97.5, or less than about 95%. Each possibility represents a separate embodiment of the invention.

In some embodiments, the first segment of the fruit constitutes from about 70% to about 99.5% of the entire surface of the total amount of grape berries. In further embodiments, the second segment of the fruit constitutes from about 80% to about 99.25% of the entire surface of the total amount of grape berries, from about 80% to about 99%, or from about 90% to about 97.5%. Each possibility represents a separate embodiment of the invention.

In some embodiments, the second segment of the fruit constitutes at least about 0.5% of the entire surface of the total amount of grape berries. According to further embodiments, the second segment of the fruit constitutes at least about 0.75% of the entire surface of the total amount of grape berries. According to still further embodiments, the second segment of the fruit constitutes at least about 1% of the entire surface of the total amount of grape berries, or at least about 2.5%, or at least about 5%. Each possibility represents a separate embodiment of the invention.

In some embodiments, the second segment of the fruit constitutes less than about 30% of the entire surface of the total amount of grape berries. In further embodiments, the second segment of the fruit constitutes less than about 20% of the entire surface of the total amount of grape berries, less than about 15%, or less than about 10%. Each possibility represents a separate embodiment of the invention.

In some embodiments, the second segment of the fruit constitutes from about 0.5% to about 30% of the entire surface of the total amount of grape berries. In further embodiments, the second segment of the fruit constitutes from about 0.75% to about 20% of the entire surface of the total amount of grape berries, from about 1% to about 15%, or from about 2.5% to about 10%. Each possibility represents a separate embodiment of the invention.

In some currently preferred embodiments, the polysaccharide being present in the protective coating described herein is an anionic or acidic polysaccharide. The polysaccharide can be selected from the list presented hereinabove. In some exemplary embodiments, the polysaccharide is selected from gellan, alginate, pectin, and combinations thereof. Each possibility represents a separate embodiment of the invention.

In some embodiments, the polysaccharide is present in the protective coating in a weight percent ranging from about 0.5% to about 85% of the total weight of the protective coating. In some embodiments, the polysaccharide is present in the protective coating in a weight percent ranging from about 0.1% (w/w) to about 1% (w/w), from about 1% (w/w) to about 10% (w/w), from about 10% (w/w) to about 30% (w/w), from about 30% (w/w) to about 50% (w/w), from about 50% (w/w) to about 70% (w/w), or from about 70% (w/w) to about 90% (w/w) of the total weight of the protective coating. In some embodiments, the polysaccharide is present in the protective coating in a weight percent ranging from about 1% to about 70% of the total weight of the protective coating. In further embodiments, the polysaccharide is present in the protective coating in a weight percent ranging from about 10% to about 50% of the total weight of the protective coating.

In some embodiments, the polysaccharide is cross-linked by a crosslinking agent. The crosslinking agent can comprise a monovalent or a divalent cation, such as, but not limited to, calcium ion, magnesium ion, potassium ion, aluminum ion, barium ion, strontium ion, copper ion, lead ion, zinc ion and combinations thereof. Each possibility represents a separate embodiment of the invention. In some exemplary embodiments, the polysaccharide is crosslinked by calcium ions.

In some embodiments, the crosslinking agent is present in the protective coating in a weight percent ranging from about 0.1% (w/w) to about 90% (w/w) of the total weight of the protective coating. In some embodiments, the crosslinking agent is present in the protective coating in a weight percent ranging from about 0.1% (w/w) to about 1% (w/w), from about 1% (w/w) to about 10% (w/w), from about 10% (w/w) to about 30% (w/w), from about 30% (w/w) to about 50% (w/w), from about 50% (w/w) to about 70% (w/w), or from about 70% (w/w) to about 90% (w/w) of the total weight of the protective coating. In some embodiments, the crosslinking agent is present in the protective coating in a weight percent ranging from about 1% (w/w) to about 70% (w/w) of the total weight of the protective coating. In further embodiments, the crosslinking agent is present in the protective coating in a weight percent ranging from about 10% (w/w) to about 50% (w/w) of the total weight of the protective coating.

In some embodiments, the protective coating further comprises water. In further embodiments, water is present in the protective coating in a weight percent ranging from about 10% (w/w) to about 99.5% (w/w) of the total weight of the protective coating. In still further embodiments, water is present in the protective coating in a weight percent ranging from about 10% (w/w) to about 90% (w/w) of the total weight of the protective coating. In yet further embodiments, water is present in the protective coating in a weight percent ranging from about 10% (w/w) to about 80% (w/w) of the total weight of the protective coating. In still further embodiments, water is present in the protective coating in a weight percent ranging from about 10% (w/w) to about 70% (w/w) of the total weight of the protective coating. In yet further embodiments, water is present in the protective coating in a weight percent ranging from about 10% (w/w) to about 60% (w/w) of the total weight of the protective coating. In still further embodiments, water is present in the protective coating in a weight percent ranging from about 10% (w/w) to about 50% (w/w) of the total weight of the protective coating.

Without wishing to being bound by theory or mechanism of action, it is contemplated that the protective coating on the surface of the postharvest plant matter can be present in a form of a semi-dried or dried hydrocolloid gel, depending, inter alia, on the moisture content of the underlying tissue. The weight percentage of water in the protective coating, as well as the weight percentage of the polysaccharide, are therefore dependent on the type of the plant, the degree of drying of the coating and ambient conditions.

In one embodiment, the protective coating comprises gellan crosslinked by calcium ions. In another embodiment, the protective coating comprises alginate crosslinked by calcium ions. In yet another embodiment, the protective coating comprises pectin crosslinked by calcium ions.

The protective coating can further comprise at least one additive selected from antioxidants, food grade acidulants, preservatives, pH modifiers, aroma compounds, colorants, sweeteners, viscosity formers, antifoaming agents, adhesion-promoters, plasticizers, emulsifiers, surface-tension modifiers, humectants, and hydrophobic components, as listed hereinabove. In certain embodiments, the at least one additive is selected from ascorbic acid, L-cysteine, citric acid, malic acid, fumaric acid, lactic acid, succinic acid, pyruvic acid, oxaloacetic acid, quinic acid, tartaric acid, oleic acid, linoleic acid, stearic acid, sulfuric acid, hydrofluoric acid, sodium chloride, sodium hypochlorite, sodium bisulfite, sodium carbonate, sodium hydroxide, sodium silicate, sodium phosphate, lime, potassium sorbate, sodium benzoate, potassium oleate, glucose, fructose, sucrose, sucralose, aspartame, sorbitol, sorbitan, polysorbate, glycerol, propylene glycol, propylene glycol monostearate, ethylene glycol monostearate, ethanol, locust bean gum (LBG), gum tragacanth, pullulan, POLYOX, gelatin, xanthan, guar gum, karya gum, fenugreek, lecithin, ammonium lauryl sulfate, sodium steroyl-2-lactylate, sodium alkyl sulfate, sodium hexametaphosphate, beeswax, carnauba wax, candelilla wax, Japan wax, soy wax, castor wax, bayberry wax montan wax, microcrystalline wax, paraffin wax, phosphated monoglyceride, phosphated diglyceride, acetylated monoglyceride, alkyl polyacrylate, polyether, synthetic fragrance, semi-synthetic fragrance, natural fragrance, natural-identical fragrance, synthetic pigment, semi-synthetic pigment, natural pigment, and combinations thereof.

The thickness of the protective coating covering the exposed surface of the fruit (i.e., the second segment thereof) can range from about 5 um to about 3000 um. According to some embodiments, the protective coating has a thickness ranging from about 10 um to about 1000 um. According to further embodiments, the protective coating has a thickness ranging from about 20 um to about 600 um. According to still further embodiments, the protective coating has a thickness ranging from about 50 um to about 400 um. According to yet further embodiments, the protective coating has a thickness ranging from about 100 um to about 200 um.

The ready-to-eat fruit according to the principles of the invention can be provided in a packaging, such as, for example, containers with perforated plastic covering.

As used herein and in the appended claims the singular forms "a", "an," and "the" include plural references unless the content clearly dictates otherwise. Thus, for example, reference to "a fruit" includes a plurality of such fruits, and equivalents thereof known to those skilled in the art (such as, for example, berries), and so forth. The term "plurality" means one or more. It should be noted that the term "and" or the term "or" is generally employed in its sense including "and/or" unless the content clearly dictates otherwise. As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed methods.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1

Creating the Blocking Bandage on Pomegranate Arils

Fruit Processing

Pomegranate fruits (*Punica granatum* L. "Wonderful") were obtained at the commercial harvest date at the local market (Rehovot, Israel). The damaged fruits were removed and the outer skins of healthy were washed in tap water using a brush. Husks were carefully cut at the equatorial zone with sharpened knifes and the arils were manually extracted. The extracted arils were collected in a tray and mixed to assure uniformity.

Arils were randomly distributed into several equally weighed groups.

Wetting properties of the arils' surface were tested by water contact angle measurement. Contact angles were measured by the sessile drop method using a First Ten Angstroms goniometer, model FTA200 (Portsmouth, VA, USA). A small drop of distilled water (about 3 µL) was deposited on the pomegranate aril surface using a microliter syringe and images of the drop profiles were converted by computer. All measurements were performed in triplicate.

Figure 1B:
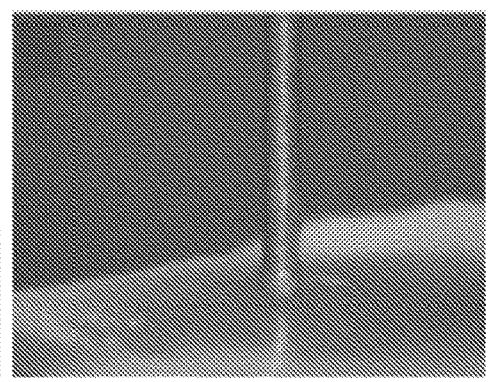

The contact angle (θ) for water on the intact pomegranate aril surface was 95.18±3.08° (average±SD) (FIG. 1A). In contrast, on the damaged aril surface, the water drop immediately flattened and was incorporated into the wet damaged aril surface (FIG. 1B), preventing accurate measurements of the contact angle on that surface. These contact angle measurements indicated that the intact and damaged pomegranate aril surfaces were hydrophobic and hydrophilic, respectively.

Figure 2A:
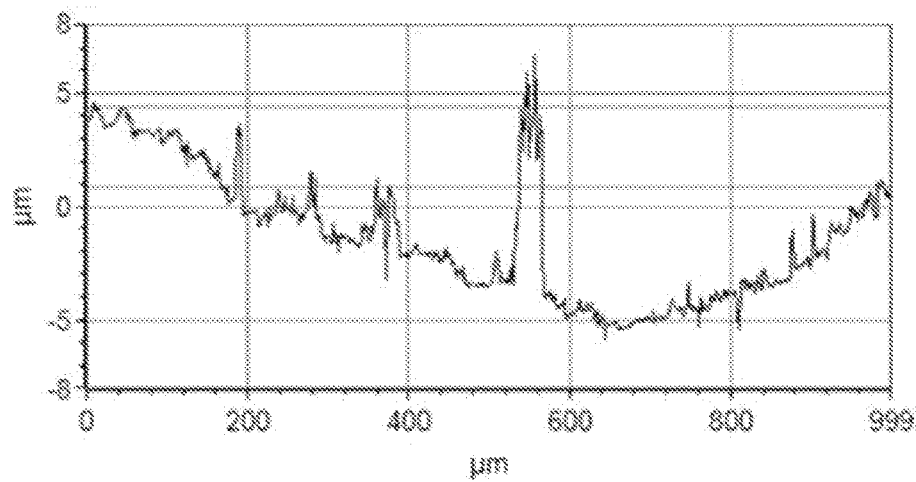
FIGS. 2A-2B: Surface topography of a 1 mm×1 mm section of a pomegranate aril surface measured by optical profilometer, including X profile of said section (FIG. 2A) and Y profile of said section (FIG. 2B).
Figure 2B:
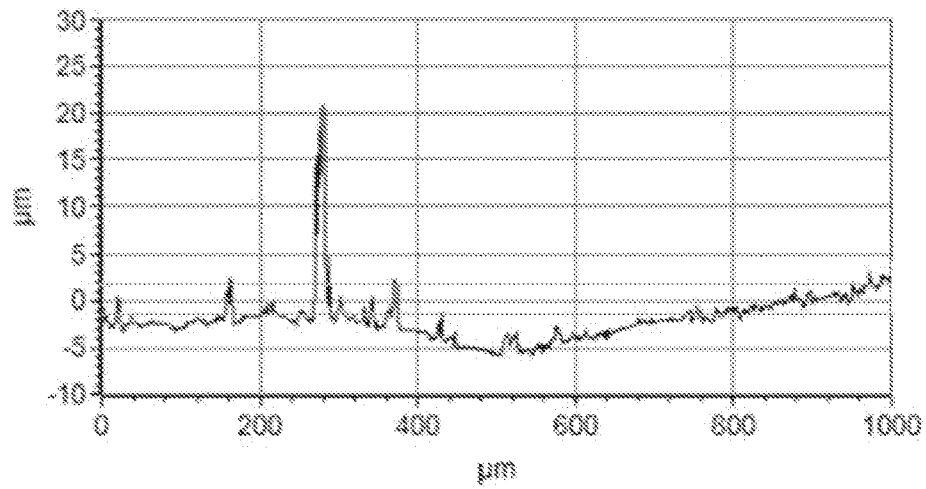

The roughness and surface topography of the intact aril were measured by optical profilometer (FIGS. 2A-2B). Hexagonal structures, which seemed to represent the epidermal cells, were clearly noticeable. The outline of these cells, protruding slightly from the surface, affected roughness. Still, the roughness factor (Ra) value was found to be relatively low (3.4 µm). These results suggest that the wettability of the aril's non-damaged outer skin by the alginate solution is not extensive.

Further, to deliberately produce damaged arils, an incision was made at the top of each aril using a spatula.

Preparation of the Aqueous Solutions for Immersion

Aqueous solutions (w/w) of 0.5% gellan, 1% alginate, 3.5% pectin (LMP) and 1% calcium chloride were prepared.

Gellan powder (CP Kelco, San Diego, CA, USA) was dispersed in distilled water using a magnetic stirrer (Freed Electric, Haifa, Israel). The mixture was agitated and brought to boiling to complete the gum dissolution. The hot solution was then cooled to 25° C.

Alginate powder (Sigma, St. Louis, MO, USA) was dispersed in distilled water using a magnetic stirrer (Freed Electric, Haifa, Israel). The mixture was agitated until completion of the gum dissolution at 25° C.

Pectin powder (CP Kelco, San Diego, CA, USA) was dispersed in distilled water using a magnetic stirrer (Freed Electric, Haifa, Israel). The mixture was agitated until completion of the gum dissolution at 25° C.

Calcium chloride pearls (Daejung, Siheung-si, Gyeonggi-do, Korea) were dispersed in distilled water using a magnetic stirrer (Freed Electric, Haifa, Israel). The mixture was agitated until completion of the salt dissolution at 25° C.

Coating Pomegranate Arils

The technology is based upon chemical reaction between the crosslinking agent cations and polysaccharide in order to create the blocking bandage.

Pomegranate arils were immersed in the calcium chloride solution for 45 sec. Then they were transferred into the continuously stirred polysaccharide solution (including gellan, alginate or pectin). The arils were suspended in the polysaccharide solution for 30 seconds (alginate solution) or 60 seconds (gellan and pectin solutions), thus creating the blocking bandage. After the second immersion they were left to dry on sieve with absorbent paper underneath at air-conditioned laboratory at 25° C. for 2 hours.

Arils, which were immersed in stirred distilled water for 1.75 min and then left to dry on sieve with absorbent paper underneath at air-conditioned laboratory at 25° C. for 2 hours, were used as the control group.

Characterization of Coated Pomegranate Arils

During the first immersion of the arils in the crosslinking agent solution (calcium chloride), wettability, followed by penetration of the water-soluble ions, occurred only where the outer skin of the aril was damaged, i.e., for the high-water-content pulp (sarcotesta). The second immersion of the arils in the polysaccharide solution resulted in the formation of a thin film of alginate gel covering only the damaged/injured surface of the aril, into which the calcium ions had diffused during the first immersion. Most of the non-crosslinked alginate fluid solution drained from the smooth and hydrophobic surface of the non-damaged arils, which is consistent with the wetting and roughness tests results.

Figure 3A:
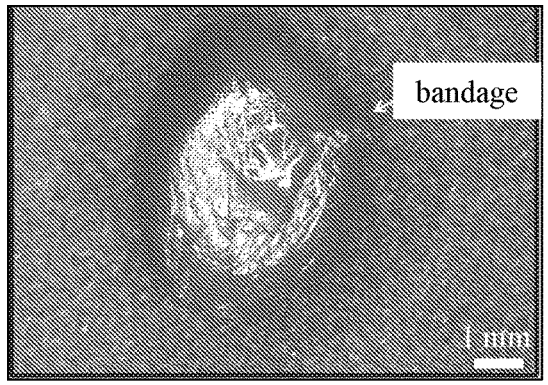
FIG. 3A: A photograph of a damaged pomegranate aril "wound", which was sealed by creating a protective coating.
Figure 3B:
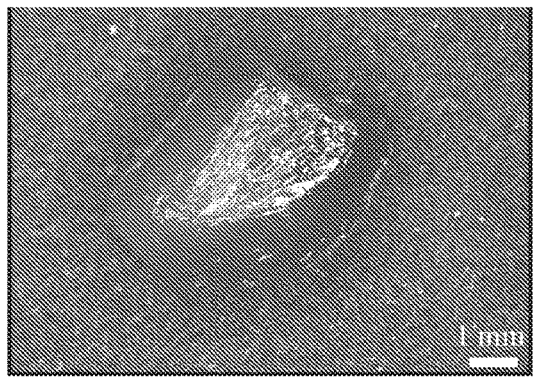
FIG. 3B: A photograph of a damaged aril without a protective coating.

As shown in FIG. 3A, the "wounds" in the damaged pomegranate arils were sealed with a blocking bandage. FIG. 3B shows a damaged aril without a protective coating (bandage).

Figure 4A:
FIGS. 4A-4D: Photographs of a multitude of pomegranate arils with different polysaccharide coatings.
Figure 4B:
Figure 4C:
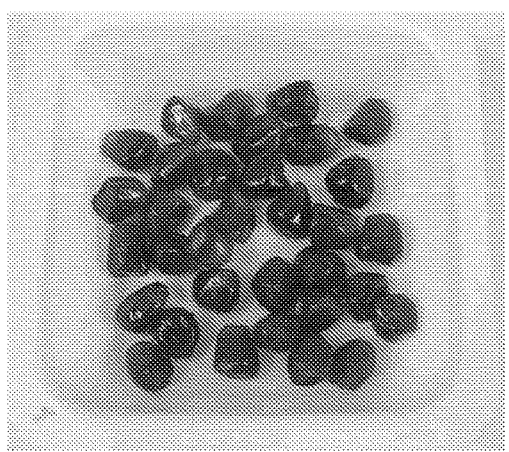
Figure 4D:
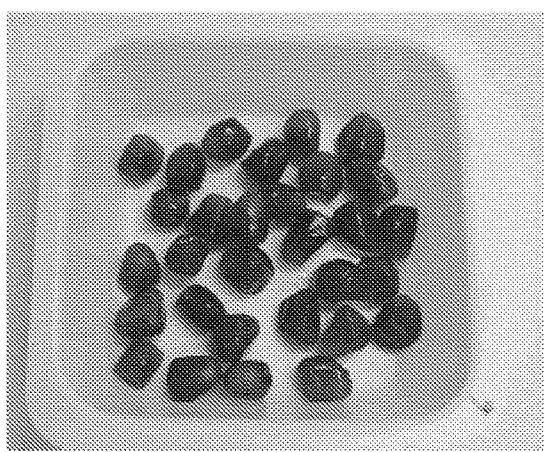

FIGS. 4A-4D show multitude of arils coated with different polysaccharide coatings (FIG. 4A—uncoated; FIG. 2B—alginate; FIG. 4C—gellan; FIG. 4D—pectin). It can be seen that the polysaccharide coating is not visually detectable.

The obtained bandage has several benefits: it completely covers the damaged areas, and it is thin and transparent, and therefore invisible to the naked eye. Furthermore, when the arils are consumed, the coating is not sensorially detected, as was demonstrated by triangle test.

A sensory triangle test was performed with the treated (alginate-"bandaged") pomegranate arils vs. the control group before storage. Seventeen trained panelists were recruited for the analysis. Three randomly coded samples—2 identical samples and 1 different sample—were presented to the panelists in random order. Panelists were asked to taste the samples in the order given, identify the different sample, and note whether they were guessing. Panelists were provided with spring water to cleanse their palates between samples. The results of the triangle test were analyzed using tables for one-tailed binomial test. One-tailed binomial analysis of the results of the 17 panelists showed that the number of correct judgments was only 5, while the minimum number of correct judgments (n=17) to establish significance at P=0.05 and P=0.01 are 10 and 11, respectively. Namely, the panelists perceived no difference between the untreated and bandaged arils before storage (day 0).

Example 2

Controlling the Thickness of the Bandage on Pomegranate Arils

The bandage thickness could be controlled by changing the immersion time in the cross-linking agent solution or polysaccharide solutions and/or by changing the concentrations of these solutions. The aqueous solutions of alginate and calcium chloride for immersion were prepared as mentioned hereinabove. Creating the blocking bandage on pomegranate arils was performed as described in Example 1, except for the different immersion times in the calcium chloride solution.

Figure 5A:
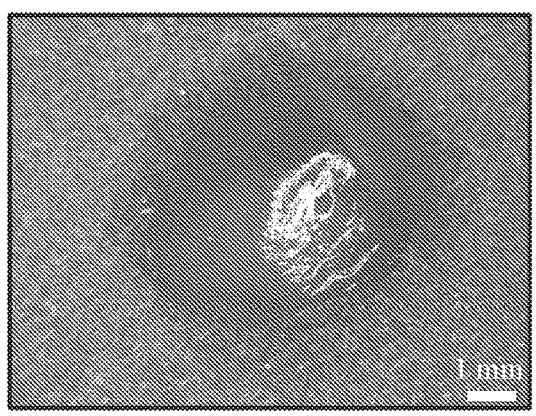
FIGS. 5A-5C: Photographs of pomegranate arils having protective coatings with varying thicknesses.
Figure 5B:
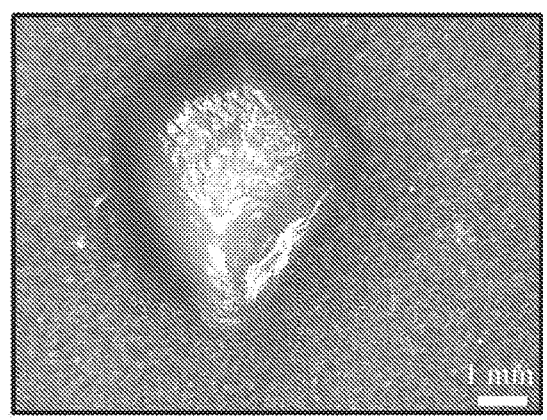
Figure 5C:
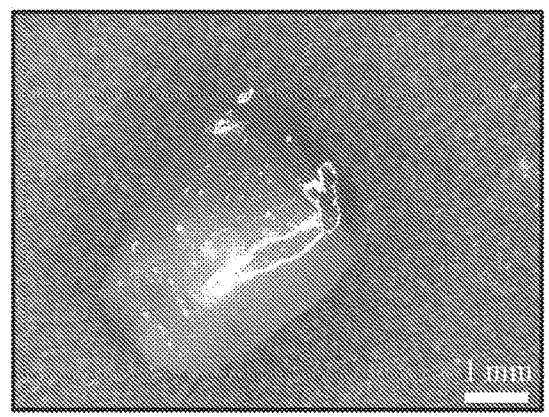

FIGS. 5A-5C display pomegranate arils having alginate protective coatings with varying thicknesses due to different immersion times. FIG. 5B presents the typical product obtained from the process described in Example 1, having a protective coating with thicknesses of about 65 um, whereas FIG. 5A shows a pomegranate aril having a protective coating with a thicknesses of about 270 um, which was obtained by increasing the immersion time in the calcium chloride solution to 1.5 min. FIG. 5C displays a pomegranate aril having a protective coating with a thicknesses of about 556 um, which was obtained by increasing the immersion time in the calcium chloride solution to 5 min. Such a long immersion time is less preferable because the coating is too thick and visually detectable.

Example 3

Weight Loss of the Coated Pomegranate Arils

The alginate-coated pomegranate arils prepared as described in Example 1 were placed in disposable plastic containers and stored at 4° C. and 45% relative humidity for 31 days.

Figure 6:
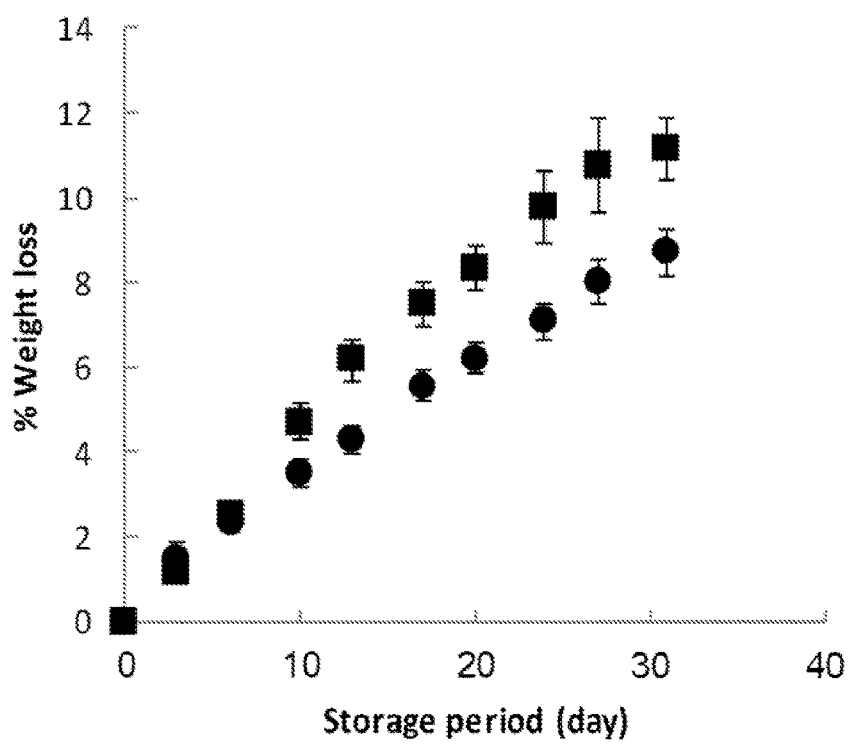
FIG. 6: Weight loss (%) of untreated (squares) vs. alginate coated (circles) pomegranate arils during storage at 4° C. Presented results are averages of 5 repetitions±SD.

The pomegranate arils were periodically weighted during storage on an analytical balance (Precisa, Dietikon, Switzerland). Weight loss was calculated as the percentage difference between the initial weight and the final weight of the pomegranate arils, as shown in FIG. 6. It can be seen that the coated arils experienced lower weight loss compared to the untreated arils. This indicates that less liquid was exuded from the coated arils during storage.

Example 4

Microbial Quality of the Coated Pomegranate Arils

Aerobic mesophilic, yeast and mold counts on pomegranate arils prepared as described in Example 1 were evaluated on days 0 and 8 of storage at 4° C. and at day 5 of storage at 20° C. A 2 g sample was placed into a sterile stomacher bag with 18 mL of saline solution. Samples were homogenized for 6 min and serial dilutions were made in saline solution. The diluted solutions were then immediately plated on nutrient agar (NA) and incubated at 37° C. for 2 d for total mesophilic aerobic bacteria or plated on potato dextrose agar (PDA) and incubated at 25° C. for 5 d for yeasts and molds. Results are presented as colony forming units (CFU) per gram of arils.

Counts of mesophilic aerobic bacteria, yeast and mold on days 0 and 8 of storage at 4° C. were ≤10 CFU/g. These results are similar to what was observed by Ayhan et al (2009) [Ayhan Z, Eştürk O, 2009, J Food Sci, 74(5): 399-405]. Higher microbial counts are expected when a commercial scale production is performed.

At a higher storage temperature of 20° C. for 5 days, mesophilic aerobic bacteria counts were ≤10 CFU/g, while for yeasts and molds counts of ≥$10^3$ CFU/g were detected. The results are detailed in Table 1. It can be observed that the hydrocolloid-based bandage significantly inhibited yeast and mold growth on arils.

TABLE 1

Yeast and mold counts on control samples and coated pomegranate arils at day 5 of storage at 20° C.

| Treatment | Yeast and mold, CFU/g |
| --- | --- |
| Untreated arils | $5 \cdot 10^6$ |
| Alginate coated arils | $5 \cdot 10^4$ |
| Pectin coated arils | $4 \cdot 10^3$ |

Example 5

Creating the Blocking Bandage on Grape Berries

Fruit Processing

Table grapes (*Vitis vinifera*) were obtained at the local market (Rehovot, Israel). After the grape berries were separated from their pedicels, they were washed in tap water. The grapes were collected in a tray and mixed to assure uniformity.

Preparation of the Aqueous Solutions for Immersion

Aqueous solutions (w/w) of 1% alginate and 1% calcium chloride were prepared.

Alginate powder (Sigma, St. Louis, MO, USA) was dispersed in distillated water using a magnetic stirrer (Freed Electric, Haifa, Israel). The mixture was agitated until completion of the gum dissolution at 25° C.

Calcium chloride pearls (Daejung, Siheung-si, Gyeonggi-do, Korea) were dispersed in distilled water using a magnetic stirrer (Freed Electric, Haifa, Israel). The mixture was agitated until completion of the salt dissolution at 25° C.

Coating Grape Berries

Grape berries were immersed in the calcium chloride solution for 1.75 min. Then they were transferred into the continuously stirred alginate solution. The grape berries were suspended in the alginate solution for further 1 min, thus creating the blocking bandage. After the second immersion they were left to dry on sieve with absorbent paper underneath at air-conditioned laboratory at 25° C. for 2 hours.

As shown in FIG. 7A, the exposed part of the grape berry was sealed with a blocking bandage filling a gap of about 2 mm in depth and 2 mm in dimeter. The gap was formed following the removal of a pedicel (as shown in FIG. 7B).

Example 6

Creating the Blocking Bandage on Stumped Tree Stem

Preparation of the Aqueous Solutions

Aqueous solutions (w/w) of 1% alginate (including fungicide), 5% calcium chloride, 10% calcium chloride and 15% calcium chloride were prepared.

Alginate powder (Sigma, St. Louis, MO, USA) was dispersed in distillated water using a magnetic stirrer (Freed Electric, Haifa, Israel). The mixture was agitated until completion of the gum dissolution at 25° C. Subsequently, Imzalil powder (fungicide) was added and dispersed in the alginate solution to form a mixture containing 1% (w/w) Imzalil.

Calcium chloride pearls (Daejung, Siheung-si, Gyeonggi-do, Korea) were dispersed in distilled water using a magnetic stirrer (Freed Electric, Haifa, Israel). The mixture was agitated until completion of the salt dissolution at 25° C.

Coating Stumped Tree Stem

The stumped tree stem of *Citrus sinensis* "Shamouti" was uniformly brushed with the calcium chloride solution. Immediately thereafter, the stumped tree stem was coated with the polysaccharide solution using a brush, thus creating the blocking bandage following the cross-linking reaction. Further on, the bandage underwent drying at ambient temperature. FIG. 8A represents a photograph of the coated stumped tree stem. FIG. 8B represents a photograph of a controlled partial peeling of the bandage from the stumped tree stem.

Example 7

Controlling the Thickness of the Bandage on Stumped Tree Stem

The bandage thickness could be controlled by changing either the concentrations of the cross-linking agent solution or the polysaccharide solution.

While certain embodiments of the invention have been illustrated and described, it will be clear that the invention is not limited to the embodiments described herein. Numerous modifications, changes, variations, substitutions and equivalents will be apparent to those skilled in the art without departing from the spirit and scope of the present invention as described by the claims, which follow.

What is claimed is:

1. A postharvest plant matter comprising:
a first segment, which is covered by natural skin; and a second segment, which has an exposed surface caused by intentional or accidental damage to the plant matter, wherein only the second segment is coated by a protective coating comprising a polysaccharide and the first segment is essentially free of said protective coating.

2. The postharvest plant matter according to claim 1, wherein the postharvest plant matter comprises a fruit.

3. The postharvest plant matter according to claim 2, wherein the fruit is a ready-to-eat fruit selected from pomegranate arils and grape berries.

4. The postharvest plant matter according to claim 3, wherein the ready-to-eat fruit comprises pomegranate arils, wherein the second segment constitutes at least about 5% of an entire surface of a total amount of the pomegranate arils.

5. The postharvest plant matter according to claim 3, wherein the fruit comprises grape berries being separated from their pedicels, wherein the second segment constitutes at least about 0.5% of an entire surface of a total amount of the grape berries.

6. The postharvest plant matter according to claim 1, wherein the polysaccharide is gellan, alginate, pectin, carrageenan or combinations thereof.

7. The postharvest plant matter according to claim 1, wherein the polysaccharide is present in the protective coating in a weight percent ranging from about 0.5% to about 85% of the protective coating.

8. The postharvest plant matter according to claim 1, wherein the polysaccharide is crosslinked by a crosslinking agent which comprises a cation of calcium ion, magnesium ion, potassium ion, barium ion, strontium ion, copper ion, lead ion, zinc ion, aluminum ion, or combinations thereof.

9. The postharvest plant matter according to claim 1, wherein the protective coating further comprises at least one additive selected from ascorbic acid, L-cysteine, citric acid, malic acid, fumaric acid, lactic acid, succinic acid, pyruvic acid, oxaloacetic acid, quinic acid, tartaric acid, oleic acid, linoleic acid, stearic acid, sulfuric acid, hydrofluoric acid, sodium chloride, sodium hypochlorite, sodium bisulfite, sodium carbonate, sodium hydroxide, sodium silicate, sodium phosphate, lime, potassium sorbate, sodium benzoate, potassium oleate, glucose, fructose, sucrose, sucralose, aspartame, sorbitol, sorbitan, polysorbate, glycerol, propylene glycol, propylene glycol monostearate, ethylene glycol monostearate, ethanol, locust bean gum (LBG), gum tragacanth, pullulan, POLYOX, gelatin, xanthan, guar gum, karya gum, fenugreek, lecithin, ammonium lauryl sulfate, sodium steroyl-2-lactylate, sodium alkyl sulfate, sodium hexametaphosphate, beeswax, carnauba wax, candelilla wax, Japan wax, soy wax, castor wax, bayberry wax montan wax, microcrystalline wax, paraffin wax, phosphated monoglyceride, phosphated diglyceride, acetylated monoglyceride, alkyl polyacrylate, polyether, synthetic fragrance, semi-synthetic fragrance, natural fragrance, natural-identical fragrance, synthetic pigment, semi-synthetic pigment, or natural pigment.

* * * * *